(12) United States Patent
Woodrow et al.

(10) Patent No.: US 11,840,266 B2
(45) Date of Patent: Dec. 12, 2023

(54) SYSTEMS AND METHODS FOR CONTROLLING AN AUTONOMOUS VEHICLE

(71) Applicant: UATC, LLC, Mountain View, CA (US)

(72) Inventors: Alden James Woodrow, Oakland, CA (US); Eyal Cohen, San Francisco, CA (US); Robert Evan Miller, San Mateo, CA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/564,873

(22) Filed: Dec. 29, 2021

(65) Prior Publication Data

US 2022/0163963 A1    May 26, 2022

Related U.S. Application Data

(63) Continuation of application No. 15/980,324, filed on May 15, 2018, now Pat. No. 11,215,984.
(Continued)

(51) Int. Cl.
*B60W 60/00* (2020.01)
*G05D 1/00* (2006.01)
*G08G 1/00* (2006.01)

(52) U.S. Cl.
CPC ......... *B60W 60/007* (2020.02); *G05D 1/0011* (2013.01); *G05D 1/0027* (2013.01);
(Continued)

(58) Field of Classification Search
CPC . B60W 60/007; G05D 1/0011; G05D 1/0027; G05D 1/0088; G05D 2201/0213; G08G 1/20; G08G 1/22
See application file for complete search history.

(56) References Cited

U.S. PATENT DOCUMENTS

| 9,298,186 B2 | 3/2016 | Harvey |
| 9,494,943 B2 | 11/2016 | Harvey |

(Continued)

FOREIGN PATENT DOCUMENTS

| DE | 102016006672 | 12/2016 |
| WO | WO2017048165 | 3/2017 |

(Continued)

OTHER PUBLICATIONS

"Bait Car" Television Series, Court TV (now TruTV), 5 seasons—135 episodes, aired Aug. 6, 2007 thru Oct. 23, 2012, wikipedia.com description included, 4 pages (Year: 2007).

(Continued)

*Primary Examiner* — Dale W Hilgendorf
(74) *Attorney, Agent, or Firm* — Dority & Manning, P.A.

(57) ABSTRACT

Systems and methods for controlling an autonomous vehicle in response to vehicle instructions from a remote computing system are provided. In one example embodiment, a computer-implemented method includes controlling a first autonomous vehicle to provide a vehicle service, the first autonomous vehicle being associated with a first convoy that includes one or more second autonomous vehicles. The method includes receiving one or more communications from a remote computing system associated with a third-party entity, the one or more communications including one or more vehicle instructions. The method includes coordinating with the one or more second autonomous vehicles to determine one or more vehicle actions to perform in response to receiving the one or more vehicle instructions from the third-party entity. The method includes controlling the first autonomous vehicle to implement the one or more vehicle actions.

18 Claims, 9 Drawing Sheets

Related U.S. Application Data

(60) Provisional application No. 62/615,206, filed on Jan. 9, 2018.

(52) U.S. Cl.
CPC ... *G05D 1/0088* (2013.01); *G05D 2201/0213* (2013.01); *G08G 1/20* (2013.01); *G08G 1/22* (2013.01)

(56) References Cited

U.S. PATENT DOCUMENTS

| | | | | |
|---|---|---|---|---|
| 9,599,986 | B1* | 3/2017 | Eberbach | B60W 60/007 |
| 10,303,166 | B2* | 5/2019 | Iagnemma | B60W 30/12 |
| 10,699,580 | B1* | 6/2020 | Gross | H04W 4/90 |
| 10,717,448 | B1* | 7/2020 | Seo | G05D 1/0022 |
| 11,122,400 | B2* | 9/2021 | Inam | H04W 4/44 |
| 11,215,984 | B2* | 1/2022 | Woodrow | G05D 1/0293 |
| 2002/0016653 | A1* | 2/2002 | Levine | B60T 7/12 |
| | | | | 701/1 |
| 2002/0070881 | A1* | 6/2002 | Marcarelli | G08G 1/20 |
| | | | | 340/8.1 |
| 2005/0258942 | A1* | 11/2005 | Manasseh | G07C 5/008 |
| | | | | 340/425.5 |
| 2007/0221782 | A1* | 9/2007 | Cerchie | B64C 13/22 |
| | | | | 244/75.1 |
| 2010/0256852 | A1* | 10/2010 | Mudalige | G08G 1/22 |
| | | | | 701/24 |
| 2017/0038777 | A1* | 2/2017 | Harvey | G05D 1/0022 |
| 2017/0344023 | A1 | 11/2017 | Laubinger et al. | |
| 2018/0011485 | A1* | 1/2018 | Ferren | G05D 1/0022 |
| 2018/0202822 | A1 | 7/2018 | Delizio | |
| 2018/0253976 | A1* | 9/2018 | Inam | G08G 1/22 |
| 2018/0356837 | A1 | 12/2018 | Lisewski et al. | |
| 2019/0004513 | A1 | 1/2019 | Chiba et al. | |
| 2019/0035269 | A1* | 1/2019 | Donovan | B60W 30/09 |
| 2019/0155285 | A1* | 5/2019 | Wang | G05D 1/0255 |
| 2019/0163176 | A1 | 5/2019 | Wang et al. | |
| 2019/0202467 | A1* | 7/2019 | Sun | B60W 50/14 |
| 2019/0354101 | A1 | 11/2019 | Sujan et al. | |
| 2020/0150667 | A1* | 5/2020 | Rakshit | A61B 5/747 |
| 2022/0126878 | A1* | 4/2022 | Moustafa | G06T 1/0007 |
| 2023/0138112 | A1* | 5/2023 | Gross | G08G 1/166 |
| | | | | 701/24 |

FOREIGN PATENT DOCUMENTS

| | | | | |
|---|---|---|---|---|
| WO | WO2017148531 | | 9/2017 | |
| WO | WO-2019040929 A1 * | | 2/2019 | B60Q 9/00 |

OTHER PUBLICATIONS

Extended European Search Report for Application No. 21210479.8, dated Mar. 25, 2022, 4 pages.

International Search Report and Written Opinion for Application No. PCT/US2019/012857, dated Apr. 2, 2019, 12 pages.

* cited by examiner

SYSTEMS AND METHODS FOR CONTROLLING AN AUTONOMOUS VEHICLE

PRIORITY CLAIM

The present application claims the benefit of priority of U.S. Non-Provisional patent application Ser. No. 15/980,324 filed May 15, 2018, now U.S. Pat. No. 11,215,984, which claims the benefit of priority of U.S. Provisional Patent Application No. 62/615,206 filed Jan. 9, 2018, entitled "Systems and Methods for Controlling Autonomous Vehicle." The above-referenced patent applications are incorporated herein by reference in their entirety.

FIELD

The present disclosure relates generally to controlling an autonomous vehicle in response to communications sent by a third-party entity.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion plan through such surrounding environment.

SUMMARY

Aspects and advantages of the present disclosure will be set forth in part in the following description, or may be learned from the description, or may be learned through practice of the embodiments.

One example aspect of the present disclosure is directed to a computer-implemented method for controlling an autonomous vehicle in response to vehicle instructions from a remote computing system. The method includes controlling, by one or more computing devices, a first autonomous vehicle to provide a vehicle service, the first autonomous vehicle being associated with a first convoy that includes one or more second autonomous vehicles. The method includes receiving, by the one or more computing devices, one or more communications from a remote computing system associated with a third-party entity, the one or more communications including one or more vehicle instructions. The method includes coordinating, by the one or more computing devices, with the one or more second autonomous vehicles to determine one or more vehicle actions to perform in response to receiving the one or more vehicle instructions from the third-party entity. The method includes controlling, by the one or more computing devices, the first autonomous vehicle to implement the one or more vehicle actions.

Another example aspect of the present disclosure is directed to a computing system for controlling an autonomous vehicle in response to vehicle instructions from a remote computing system. The computing system includes one or more processors and one or more tangible, non-transitory, computer readable media that collectively store instructions that when executed by the one or more processors cause the computing system to perform operations. The operations include controlling a first autonomous vehicle to provide a vehicle service, the first autonomous vehicle being associated with a first convoy that includes one or more second autonomous vehicles. The operations include receiving one or more communications from a remote computing system associated with a third-party entity, the one or more communications including one or more vehicle instructions. The operations include coordinating with the one or more second autonomous vehicles to determine one or more vehicle actions to perform in response to receiving the one or more vehicle instructions from the third-party entity. The operations include controlling the first autonomous vehicle to implement the one or more vehicle actions.

Yet another example aspect of the present disclosure is directed to an autonomous vehicle. The autonomous vehicle includes one or more processors and one or more tangible, non-transitory, computer readable media that collectively store instructions that when executed by the one or more processors cause the autonomous vehicle to perform operations. The operations include controlling a first autonomous vehicle to provide a vehicle service, the first autonomous vehicle being selected from a fleet of vehicles controlled by a first entity to provide the vehicle service to a second entity. The operations include receiving one or more communications from a remote computing system associated with a third entity, the one or more communications including one or more vehicle instructions. The operations include determining one or more vehicle actions to perform in response to the one or more vehicle instructions. The operations include controlling the first autonomous vehicle to implement the one or more vehicle actions.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which.

Figure 1:
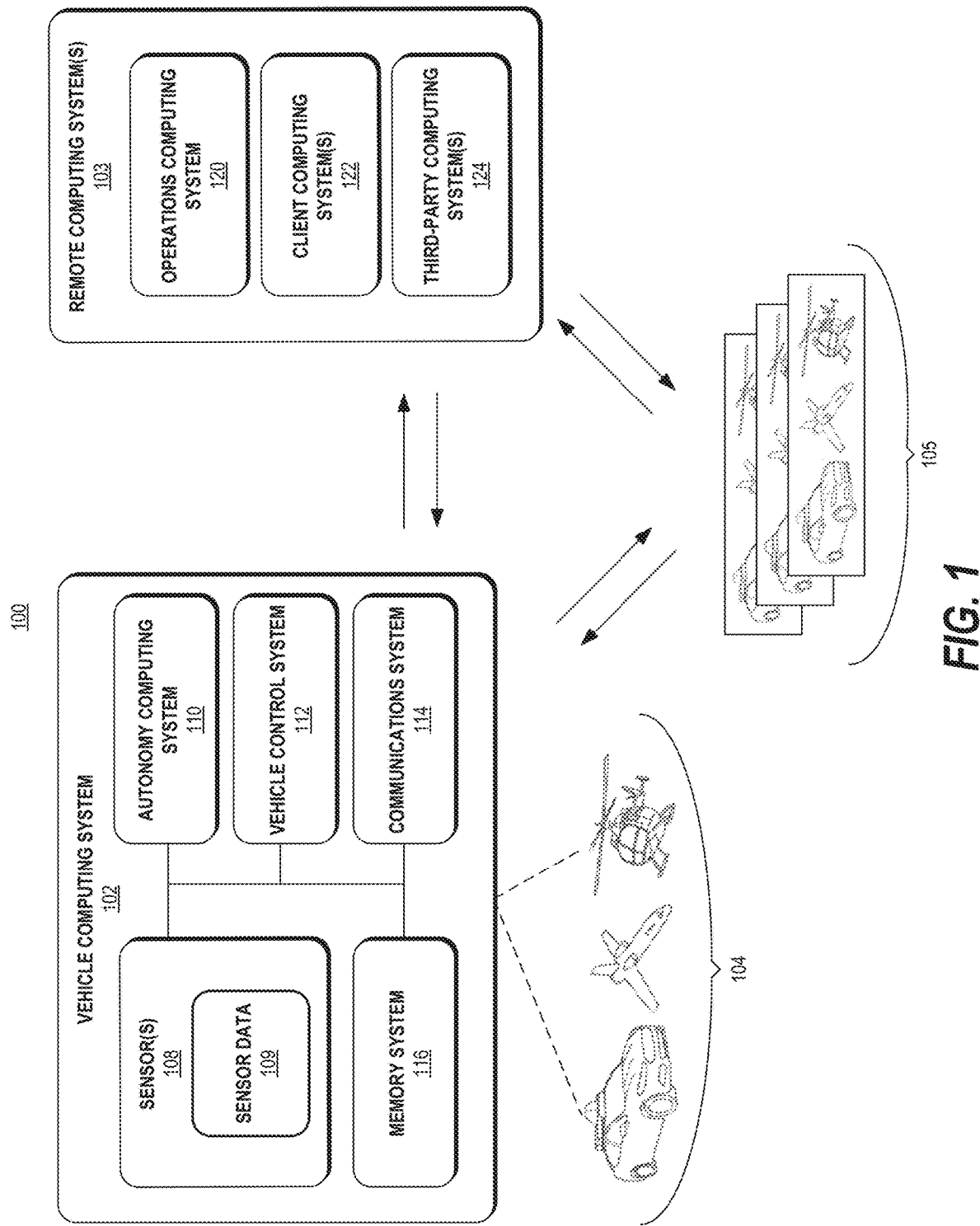
FIG. 1 depicts a block diagram of an example system overview according to example embodiments of the present disclosure.

Reference numerals that are repeated across plural figures are intended to identify the same components or features in various implementations.

DETAILED DESCRIPTION

Example aspects of the present disclosure are directed to managing a fleet of vehicles in response to communications sent by a third-party entity. An entity (e.g., a service provider) can operate the fleet of vehicles to provide a vehicle service for another entity requesting the vehicle service (e.g., a client). The service provider can operate the fleet of vehicles in one or more jurisdictions under the purview of one or more third-party entities (e.g., law enforcement entity, transportation infrastructure regulatory entity, tax assessment entity, etc.). The fleet can include, for example, autonomous vehicles that can drive, navigate, operate, etc. with minimal and/or no interaction from a human driver. Systems and methods of the present disclosure can enable an autonomous vehicle that is providing a vehicle service, to receive one or more vehicle command(s) from a third-party entity, and to perform one or more vehicle action(s) in response to the vehicle command(s) sent by the third-party entity.

More particularly, a service provider can operate a fleet of one or more vehicles (e.g., ground-based vehicles) to provide a vehicle service such as a transportation service, a courier service, a delivery service, etc. The vehicles can be autonomous vehicles that include various systems and devices configured to control the operation of the vehicle. For example, an autonomous vehicle can include an onboard vehicle computing system for operating the vehicle (e.g., located on or within the autonomous vehicle). In some implementations, the autonomous vehicles can operate in an autonomous mode. For example, the vehicle computing system can receive sensor data from sensors onboard the vehicle (e.g., cameras, LIDAR, RADAR), attempt to comprehend the environment proximate to the vehicle by performing various processing techniques on the sensor data, and generate an appropriate motion plan through the environment. In some implementations, the autonomous vehicles can operate in a manual mode. For example, a human operator (e.g., driver) can manually control the autonomous vehicle. Moreover, the autonomous vehicle can be configured to communicate with one or more computing device(s) that are remote from the vehicle. For example, the autonomous vehicle can communicate with an operations computing system that can be associated with the service provider. The operations computing system can help the service provider monitor, communicate with, manage, etc. the fleet of vehicles. As another example, the autonomous vehicle can communicate with one or more other vehicles (e.g., a vehicle computing system onboard each of the one or more other vehicles in the fleet), third-party computing systems (e.g., a client computing system, law enforcement computing system, transportation infrastructure computing system, tax assessment computing system, etc.), or other remote computing systems. In some implementations, the operations computing system can mediate communication between the autonomous vehicle and the computing device(s) that are remote from the vehicle.

According to aspects of the present disclosure, a vehicle application programming interface (Vehicle API) platform can provide for a translation/transport layer as an interface between vehicle computing systems onboard vehicles within an entity's fleet and one or more remote clients and/or applications operating on a remote computing system (e.g., a vehicle computing system onboard each of the one or more other vehicles in the fleet, a third-party computing system, etc.). For example, the Vehicle API platform can receive data from a vehicle over a communications pipeline established with the Vehicle API. The Vehicle API platform can provide for communicating vehicle data to the remote computing system in a secure manner that allows for expanded processing of vehicle data off the vehicle, analyzing such data in real time, and/or the like. According to example aspects of the present disclosure, a Vehicle API platform can be vehicle agnostic, allowing for any autonomous vehicle and/or computer-capable vehicle to interact with a remote computing system by providing a consistent communication pipeline that any vehicle computing system would be able to use to send vehicle data (e.g., vehicle state information, etc.) and/or receive messages (e.g., command/control messages, configuration messages, etc.) from a remote computing system.

According to aspects of the present disclosure, one or more autonomous vehicle(s) in the fleet can receive one or more vehicle command(s) from a third-party computing system associated with a third-party entity, and determine one or more vehicle action(s) to perform in response to the vehicle command(s). The third-party entity can be a law enforcement entity, and more particularly a representative of the law enforcement entity, such as, for example, a police officer. The police officer can send vehicle command(s) to the autonomous vehicle(s) via the third-party computing system.

In some implementations, the autonomous vehicle(s) can be configured to receive the vehicle command(s) from the third-party computing system via a local-area or short-range communication network. For example, the autonomous vehicle(s) can receive the vehicle command(s) via a direct line-of-sight communication network. In this way, the third-party computing system can be limited to controlling the autonomous vehicle(s) via the vehicle command(s) when the third-party entity associated with the third-party computing system can directly observe the autonomous vehicle(s), or when the third-party entity and/or third-party computing system is proximate to the autonomous vehicle(s).

In some implementations, the autonomous vehicle(s) can be initially configured as being unselected. The unselected autonomous vehicle(s) can be configured to respond only to vehicle command(s) for selecting an autonomous vehicle from the third-party entity. In response to receiving vehicle command(s) for selecting an autonomous vehicle, the unselected autonomous vehicle(s) can be configured as being selected. The selected autonomous vehicle(s) can be configured to respond to additional vehicle command(s) from the third-party entity.

As an example, a police officer can identify a first autonomous vehicle and send vehicle command(s) for selecting an autonomous vehicle, to the first autonomous vehicle. In response to receiving the vehicle command(s), the first autonomous vehicle can be configured as being selected. In addition, the first autonomous vehicle can perform vehicle action(s) to indicate the selection, for example, by flashing external indicator lights, displaying a message on an external display, or performing other vehicle action(s) that can be perceived by the police officer so that the police officer can determine that the first autonomous vehicle is selected.

As another example, a police officer can identify a first autonomous vehicle and send vehicle command(s) to select the first autonomous vehicle. The police officer can then send vehicle command(s) instructing the selected first autonomous vehicle to relay future vehicle command(s) from the police officer to a second autonomous vehicle. The vehicle command(s) can identify the second autonomous vehicle based on an identifier associated with the second autonomous vehicle, or based on a relative position of the second autonomous vehicle with respect to the first autonomous vehicle (e.g., in front, behind, etc.). In response to the vehicle command(s), the first autonomous vehicle can communicate with the second autonomous vehicle for sending data indicative of the future vehicle command(s) to the second autonomous vehicle. The future vehicle command(s) can include vehicle command(s) for selecting an autonomous vehicle. When the first autonomous vehicle receives the future vehicle command(s), the first autonomous vehicle can send data indicative of the future vehicle command(s) to the second autonomous vehicle. In response to receiving the data from the first autonomous vehicle, the second autonomous vehicle can be configured as being selected. The first autonomous vehicle can then be configured as being unselected.

As another example, a police officer can identify a first autonomous vehicle and broadcast vehicle command(s) for selecting an autonomous vehicle, with an intent to select the first autonomous vehicle. If a second autonomous vehicle receives the vehicle command(s) instead of the first autonomous vehicle, then the second autonomous vehicle can be selected. The police officer can broadcast vehicle command(s) instructing the selected second autonomous vehicle to relay future vehicle command(s) to the first autonomous vehicle. The vehicle command(s) can, for example, instruct the second autonomous vehicle to relay the future vehicle command(s) to an autonomous vehicle in front of the second autonomous vehicle or behind the second autonomous vehicle. The future vehicle command(s) can include vehicle command(s) for selecting an autonomous vehicle. When the second autonomous vehicle receives the future vehicle command(s), the second autonomous vehicle can send data indicative of the future vehicle command(s) to the first autonomous vehicle. In response to receiving the data from the second autonomous vehicle, the first autonomous vehicle can be configured as being selected. The second autonomous vehicle can then be configured as being unselected.

As another example, a police officer can identify a first autonomous vehicle and send vehicle command(s) selecting the first autonomous vehicle. The vehicle command(s) can include or otherwise indicate a reason for the selection, such as, for example, low tire pressure, broken windshield, fluid leak, etc. The police officer can send vehicle command(s) instructing the first autonomous vehicle to provide information indicating the reason for the selection to a service provider. The first autonomous vehicle can determine one or more vehicle action(s) to perform in response to the vehicle command(s) from the police officer. The vehicle action(s) can include, for example, communicating with the service provider to send data indicative of the reason for the selection. In response, the service provider can, for example, schedule the first autonomous vehicle for a maintenance service or a repair service at a later time.

As another example, a police officer can identify a first autonomous vehicle and send vehicle command(s) selecting the first autonomous vehicle and instructing the first autonomous vehicle to provide status information associated with the vehicle. The first autonomous vehicle can determine one or more vehicle action(s) to perform in response to the vehicle command(s) from the police officer. If the vehicle command(s) instructing the first autonomous vehicle to provide the status information include or otherwise indicate one or more vehicle component(s) of interest, then the vehicle action(s) can include generating status information data that includes a status of the vehicle component(s). Otherwise, the vehicle action(s) can include generating status information data that includes, for example, an overall status or health of the first autonomous vehicle, a status of a default set of vehicle component(s), or other status information associated with the first autonomous vehicle. The first autonomous vehicle can provide the status information to the third-party computing system associated with the police officer. The police officer can review the status information to verify the tire pressure of the first autonomous vehicle and take further action if necessary. The further action can include, for example, sending vehicle command(s) that instruct the first autonomous vehicle to stop, travel to a maintenance area, etc.

As another example, a police officer can identify a first autonomous vehicle and send vehicle command(s) selecting the first autonomous vehicle and instructing the first autonomous vehicle to stop. The first autonomous vehicle can determine one or more vehicle action(s) to perform in response to the vehicle command(s) from the police officer. The vehicle action(s) can include, for example, implementing a stopping action.

In some implementations, the vehicle command(s) from a third-party entity can include or otherwise indicate a reason or a priority associated with the vehicle command(s), and an autonomous vehicle can determine vehicle action(s) to perform in response to the vehicle command(s) based on the associated reason or the priority.

As an example, a police officer can identify a first autonomous vehicle and send vehicle command(s) selecting the first autonomous vehicle and instructing the vehicle to provide status information associated with the vehicle. The vehicle command(s) can include a reason for the status information, such as, for example, to check a tire pressure of the first autonomous vehicle. The first autonomous vehicle can determine one or more vehicle action(s) to perform in response to the vehicle command(s) from the police officer. The vehicle action(s) can include, for example, generating status information indicative of the vehicle's tire pressure. In this way, the first autonomous vehicle can determine vehicle action(s) to perform based on the reason associated with the vehicle command(s) from the third-party entity.

As another example, a police officer can identify a first autonomous vehicle and send vehicle command(s) selecting the first autonomous vehicle and instructing the vehicle to stop. The vehicle command(s) can include a reason for stopping the vehicle, such as, for example, low tire pressure. The first autonomous vehicle can determine that the reason for the stop is not a critical reason, and the first autonomous vehicle can perform a soft-stop vehicle action in response to the vehicle command(s). The soft-stop vehicle action can include the first autonomous vehicle continuing to travel along its route until a safe stopping location is identified (e.g., a shoulder lane, off-ramp, etc.), and stopping at the safe stopping location.

As another example, a police officer can identify a first autonomous vehicle and send vehicle command(s) selecting the first autonomous vehicle and instructing the vehicle to stop. The vehicle command(s) can include a reason for the stop, such as, for example, a fluid leak. The first autonomous vehicle can determine that the reason for the stop is a critical reason, and the first autonomous vehicle can perform an emergency-stop vehicle action in response to the vehicle command(s). The emergency-stop vehicle action can include the first autonomous vehicle immediately stopping in a lane that the autonomous vehicle is travelling in.

As another example, a police officer can identify a first autonomous vehicle and send vehicle command(s) selecting the first autonomous vehicle and instructing the vehicle to stop. The vehicle command(s) can include an associated priority level, such as, for example, low-priority or high-priority. If the priority level is low-priority, then the first autonomous vehicle can perform a soft-stop vehicle action in response to the vehicle command(s). If the priority level is high-priority, then the first autonomous vehicle can perform an emergency-stop vehicle action in response to the vehicle command(s).

As another example, a police officer can identify a first autonomous vehicle and send vehicle command(s) selecting the first autonomous vehicle and instructing the vehicle to stop. The vehicle command(s) can indicate that a reason for the stop is to enable the police officer to inspect the first autonomous vehicle. In response, the first autonomous vehicle can perform a stopping action so that the police officer can inspect the vehicle.

In some implementations, an autonomous vehicle that performs a vehicle action to come to a stop (e.g., safe-stop, emergency-stop, etc.) can implement one or more vehicle action(s) subsequent to the stopping action.

As an example, an autonomous vehicle can provide limited access to a police officer who is inspecting the autonomous vehicle.

As another example, an autonomous vehicle can communicate with the service provider to provide information indicative of vehicle command(s) from a third-party entity. The information can include a reason for the stop.

As another example, a police officer can send vehicle command(s) instructing the autonomous vehicle to resume normal operations. In response to the vehicle command(s), the autonomous vehicle can, for example, resume a vehicle service, join/rejoin a convoy, etc.

In some implementations, an autonomous vehicle can implement one or more action(s) subsequent to a stopping action based on one or more cargo asset(s) being transported by the autonomous vehicle.

As an example, if the cargo asset(s) include perishable goods, then the first autonomous vehicle can request that a second autonomous vehicle pick-up the cargo asset(s) from a location of the first autonomous vehicle and transport the cargo asset(s) instead of the first autonomous vehicle.

As another example, if the cargo asset(s) are confidential or protected, then the first autonomous vehicle can lockdown and restrict access in order to safeguard the cargo asset(s).

In some implementations, the vehicle command(s) from a third-party entity can include information used to authenticate the third-party entity. For example, the vehicle command(s) can be encrypted using a predetermined key. The predetermined key can be one of a plurality of predetermined keys previously shared between the autonomous vehicle and a plurality of third-party computing systems each associated with a third-party entity. The autonomous vehicle can receive one or more encrypted vehicle command(s) from a third-party computing system, and decrypt the encrypted vehicle command(s) using a predetermined key that is previously shared between the autonomous vehicle and the third-party computing system. In this way, the autonomous vehicle can authenticate the third-party entity.

As an example, a first predetermined key can be shared between an autonomous vehicle and a first third-party computing system associated with a first third-party entity (e.g., law enforcement entity, transportation infrastructure regulatory entity, tax assessment entity, etc.), a second predetermined key can be shared between the autonomous vehicle and a second third-party computing system associated with a second third-party entity, and a third predetermined key can be shared between the autonomous vehicle and a third third-party computing system associated with a third third-party entity. If the autonomous vehicle can decrypt the encrypted vehicle command(s) with the first predetermined key, then the autonomous vehicle can authenticate the first third-party entity in association with the encrypted vehicle command(s). If the autonomous vehicle can decrypt the encrypted vehicle command(s) with the second predetermined key, then the autonomous vehicle can authenticate the second third-party entity in association with the encrypted vehicle command(s). If the autonomous vehicle can decrypt the encrypted vehicle command(s) with the third predetermined key, then the autonomous vehicle can authenticate the third third-party entity in association with the encrypted vehicle command(s).

In some implementations, the autonomous vehicle can determine one or more vehicle action(s) to perform based in part on an authentication of the third-party entity.

As an example, an autonomous vehicle can receive vehicle command(s) instructing the vehicle to stop. If the autonomous vehicle authenticates a law enforcement entity in association with the vehicle command(s), then the autonomous vehicle can perform a stopping action to come to a stop. Alternatively, if the autonomous vehicle authenticates a tax assessment entity in association with the vehicle command(s), then the autonomous vehicle can ignore the vehicle command(s).

As another example, an autonomous vehicle can receive a vehicle command(s) instructing the vehicle to provide status information associated with the vehicle. If the autonomous vehicle authenticates a law enforcement entity in association with the vehicle command(s), then the autonomous vehicle can provide the status information relevant to the law enforcement entity (e.g., tire pressure, speed, etc.) to a third-party computing system associated with the law enforcement entity. Alternatively, if the autonomous vehicle authenticates a tax assessment entity in association with the vehicle command(s), then the autonomous vehicle can provide the status information relevant to the tax assessment entity (e.g., cargo type, cargo weight, etc.) to a third-party computing system associated with the tax assessment entity.

In some implementations, the vehicle command(s) from a third-party entity can include a vehicle identifier corresponding to a specific autonomous vehicle.

For example, an autonomous vehicle can include a static display of an identifier (e.g., an identification code corresponding to the autonomous vehicle painted on the outside of the autonomous vehicle) or a dynamic display of an identifier (e.g., an external display that displays an identification code corresponding to the autonomous vehicle). A law enforcement entity (e.g., police officer) can identify a specific autonomous vehicle based on the vehicle identifier corresponding to the specific autonomous vehicle, and send vehicle command(s) that include the vehicle identifier. A first autonomous vehicle that receives the vehicle command(s) can determine whether the vehicle identifier included in the vehicle command(s) corresponds to the first autonomous vehicle. If the vehicle identifier corresponds to the first autonomous vehicle, then the first autonomous vehicle can determine one or more vehicle action(s) to perform based on the vehicle command(s). If the vehicle identifier does not correspond to the first autonomous vehicle, then the first autonomous vehicle can ignore the vehicle command(s). Alternatively, if the vehicle identifier corresponds to a second autonomous vehicle that is proximate to the first autonomous vehicle, then the first autonomous vehicle can relay the vehicle command(s) to the second autonomous vehicle.

In some implementations, a plurality of autonomous vehicles can each receive the vehicle command(s) from a third-party entity. The plurality of autonomous vehicles can each determine one or more vehicle action(s) to perform in response to the vehicle command(s).

For example, a law enforcement entity (e.g., computing system associated with the law enforcement entity) can broadcast vehicle command(s) that are received by a first autonomous vehicle, a second autonomous vehicle, and a third autonomous vehicle. In response to receiving the vehicle command(s), the first autonomous vehicle, second autonomous vehicle, and third autonomous vehicle can each independently determine one or more vehicle action(s) to perform in response to the vehicle command(s).

According to aspects of the present disclosure, a plurality of vehicles in the fleet can operate as a convoy, such that the plurality of vehicles in the convoy travel together as a group.

In some implementations, the convoy can include a lead vehicle and one or more follower vehicle(s). The lead vehicle can be configured to operate ahead of the follower vehicle(s), and the follower vehicle(s) can be configured to follow behind the lead vehicle.

As an example, the follower vehicle(s) can be configured to follow a preceding vehicle in the convoy. The follower vehicle(s) can include a first follower vehicle, second follower vehicle, third follower vehicle, and fourth follower vehicle. The first follower vehicle can be configured to follow behind the lead vehicle, the second follower vehicle configured to follow behind the first follower vehicle, the third follower vehicle configured to follow behind the second follower vehicle, and the fourth follower vehicle can be configured to follow behind the third follower vehicle.

As another example, the follower vehicle(s) can be configured to follow at a predetermined distance. The predetermined distance can be static or dynamic, and can be based on, for example, whether the plurality of vehicles are operating on a highway or on local roads, traffic conditions (e.g., volume of traffic, speed of traffic, etc.), road conditions (e.g., road incline/decline, speed limit, construction zones, etc.), a communication range (e.g., so that the plurality of autonomous vehicles can communicate with each other), weather conditions (e.g., that affect visibility, vehicle traction, stopping distance, etc.), etc.

In some implementations, the plurality of vehicles in the convoy can operate independently, and/or communicate with each other to coordinate one or more vehicle action(s) to perform in response to vehicle command(s) from a third-party entity.

As an example, one or more autonomous vehicle(s) in the convoy can operate in an autonomous mode. Each of the autonomous vehicle(s) can obtain sensor data from sensors onboard the vehicle, attempt to comprehend the environment proximate to the vehicle by performing processing techniques on the sensor data, and generate an appropriate motion plan through the environment. In this way, each of the autonomous vehicle(s) can identify one or more obstacle(s) in the environment proximate to the vehicle, and generate a motion plan to avoid the obstacle(s). The motion plan can include, for example, avoidance maneuvers, stopping actions, etc. Additionally, or alternatively, the autonomous vehicle(s) can communicate with each other to share information, such as, for example, one or more obstacle(s) identified in the environment, avoidance maneuvers, stopping actions, or other information. The autonomous vehicle(s) can generate an appropriate motion plan based in part on the shared information. In this way, an autonomous vehicle in the convoy can know in advance about a location of an obstacle or a trajectory of another autonomous vehicle, so that the autonomous vehicle can generate a motion plan to avoid the obstacle and/or other vehicle.

As another example, in response to a stop command, an autonomous vehicle in the convoy can determine vehicle actions to perform that include: removal from the convoy, and a stopping action. The autonomous vehicle can communicate with other vehicles in the convoy to send data indicative of the stop command and/or the determined vehicle actions, and then perform the stopping action. The other vehicles in the convoy can receive the data and adjust their motion plan to maneuver past the autonomous vehicle as it performs the stopping action.

As another example, in response to a stop command, an autonomous vehicle in the convoy can determine vehicle actions to perform that include: coordinating with other vehicles in the convoy to stop as a group. The autonomous vehicle can communicate with the other vehicles in the convoy to determine coordinated stopping actions for the vehicles in the convoy. Each vehicle in the convoy can perform a respective coordinated stopping action so that the convoy can stop as a group.

In some implementations, the lead vehicle in the convoy can include a human operator. The human operator can manually control the lead vehicle (e.g., via a human-machine interface), and send one or more vehicle command(s) to the follower vehicle(s) to manage/control the convoy. The vehicle command(s) can include, for example, instructions for a follower vehicle to start, stop, slow down, speed up, increase/decrease a follow distance, follow a specific/different vehicle in the convoy, respond to or ignore a vehicle command sent by a third-party entity, etc. The vehicle command(s) can also include instructions to rearrange the convoy by adding or removing a vehicle from the convoy, as will be described further below.

As an example, the lead vehicle can be an autonomous vehicle operating in a manual mode, and a human operator can be a driver who can manually drive the lead vehicle. The human operator can also communicate (e.g., receive data, send vehicle command(s), etc.) with the follower vehicle(s) via the lead vehicle.

As another example, a human operator can identify one or more obstacle(s) in an environment. The obstacle(s) can include, for example, traffic conditions (e.g., volume of traffic, speed of traffic, etc.), road conditions (e.g., blocked lanes, incline/decline, sharp turns, speed limit, construction zones, etc.), weather conditions (e.g., that affect visibility, vehicle traction, stopping distance, etc.), etc. The human operator can manage/control the convoy by sending one or more vehicle command(s) to assist the follower vehicle(s) in navigating the environment including the obstacle(s).

As another example, a human operator in the lead vehicle of a stopped convoy can control the convoy to start/resume travelling in an environment. The human operator can determine when and how the convoy should start/resume based on one or more obstacle(s) in the environment (e.g., traffic conditions, road conditions, weather conditions, etc.) at one or more times. When the human operator decides to start/resume, the human operator can send vehicle command(s) to the follower vehicle(s) to perform coordinated starting actions and start/resume travelling in the environment.

As another example, a human operator in the lead vehicle of a convoy can determine that the convoy is approaching (or has entered) a road segment including a construction zone. The construction zone can be associated with a lower speed limit than a normal speed limit for the road segment. Upon approaching (or having entered) the construction zone, the human operator can send vehicle command(s) to instruct the follower vehicle(s) to reduce speed. Upon leaving the construction zone, the human operator can send vehicle command(s) to instruct the follower vehicle(s) to increase speed.

As another example, a human operator in the lead vehicle of a convoy can determine that an upcoming road segment along the convoy's route includes a steep decline segment. The human operator can send vehicle command(s) instructing the follower vehicle(s) to reduce speed and increase a follow distance while traversing the decline segment. After traversing the decline segment, the human operator can send vehicle command(s) instructing the follower vehicle(s) to increase speed and decrease a follow distance.

In some implementations, the lead vehicle can communicate with the follower vehicle(s) to obtain status information from the follower vehicle(s). Each of the follower vehicle(s) can generate status information data associated with the vehicle, and send the status information data to the lead vehicle. The status information data can include, for example, a vehicle location, vehicle health, vehicle diagnostics, raw sensor data, audio-visual data, a vehicle command sent by a third-party entity, etc., associated with one or more of the follower vehicle(s). A human operator in the lead vehicle can manage/control the convoy based on the received data.

As an example, each of the follower vehicle(s) in a convoy can periodically generate data indicative of the vehicle's location, and send the data to the lead vehicle. If a human operator in the lead vehicle determines that a follower vehicle is travelling too slow based on the follower vehicle's location, then the human operator can send vehicle command(s) instructing the follower vehicle to increase speed. If the human operator in the lead vehicle determines that a follower vehicle is travelling too fast, based on the follower vehicle's location, then the human operator can send vehicle command(s) instructing the follower vehicle to reduce speed.

As another example, a follower vehicle in a convoy can encounter an obstacle or an unfamiliar environment that the follower vehicle is unable to navigate. The follower vehicle can generate data indicative of the obstacle or unfamiliar environment, and send the data to the lead vehicle in the convoy. A human operator in the lead vehicle can instruct the follower vehicle to send audio-visual data from one or more cameras onboard the vehicle, and manually control the follower vehicle to navigate past the obstacle or unfamiliar environment.

As another example, a follower vehicle in a convoy can receive vehicle command(s) from a third-party entity selecting the vehicle and instructing the it to stop. The vehicle command(s) can also include a reason for the stop, such as, for example, because the third-party entity believes that a tire pressure of the selected follower vehicle is too low. The selected follower vehicle can send data indicative of the vehicle command(s) sent by the third-party entity to the lead vehicle. A human operator in the lead vehicle can check the reason for the stop command based on vehicle diagnostics data received from the selected follower vehicle. The vehicle diagnostics data can include, for example, a tire pressure of the vehicle, as measured by one or more sensor(s) onboard the vehicle. Alternatively, the human operator can send vehicle command(s) to the selected follower vehicle for the vehicle diagnostics data, and the selected follower vehicle can send the data in response to the vehicle command(s). If the human operator determines that the tire pressure is normal, then the human operator can send vehicle command(s) instructing the selected follower vehicle to ignore the stop command sent by the third-party entity. If the human operator determines that the tire pressure is not normal, then the human operator can send vehicle command(s) instructing all vehicles in the convoy to stop as a group, so that the human operator can inspect the selected follower vehicle. Alternatively, if the human operator determines that the tire pressure is not normal, then the human operator can send vehicle command(s) to remove the selected follower vehicle from the convoy, so that the selected follower vehicle can come to a stop independently of the convoy, and the convoy can continue without the selected follower vehicle.

As another example, a selected follower vehicle in a convoy can receive vehicle command(s) from a third-party entity instructing the vehicle to stop because the third-party entity would like to inspect the vehicle. The vehicle command(s) can also include a request for a human to be present at the inspection. The selected follower vehicle can send data indicative of the vehicle command(s) from the third-party entity to the lead vehicle. In response, a human operator in the lead vehicle can send vehicle command(s) instructing all vehicles in the convoy to stop as a group, so that the human operator can be present for the inspection by the third-party entity.

In some implementations, one or more vehicles in a convoy can be removed from the convoy, and the convoy can be rearranged to continue without the one or more vehicles.

As an example, the convoy can include a first vehicle that is configured as a lead vehicle, a second vehicle configured to follow the first vehicle, a third vehicle configured to follow the second vehicle, and a fourth vehicle configured to follow the third vehicle. If the first vehicle in the convoy receives a vehicle command to stop, then the first vehicle can send vehicle commands to stop the convoy. If the second vehicle in the convoy receives a vehicle command to stop from a third-party entity, then the second vehicle can be removed from the convoy, and the third vehicle can be configured to follow the first vehicle. Additionally, the first vehicle can slow down and/or the third and fourth vehicles can speed up to maintain a predetermined distance between the vehicles in the convoy. If the third vehicle in the convoy receives a vehicle command to stop, then the third vehicle can be removed from the convoy, and the fourth vehicle can be configured to follow the second vehicle. Additionally, the first and second vehicles can slow down and/or the fourth vehicle can speed up to maintain a predetermined distance between the vehicles in the convoy.

As another example, in response to vehicle command(s) to stop, a selected autonomous vehicle in the convoy can determine vehicle actions to perform that include: removal from the convoy, and a stopping action. The selected autonomous vehicle can communicate with other vehicles in the convoy to send data indicative of the determined vehicle actions. In response, the convoy can be rearranged to continue without the selected autonomous vehicle, and the rearranged convoy can maneuver past the selected autonomous vehicle as it performs the stopping action.

As another example, in response to vehicle command(s) to stop, a selected autonomous vehicle in the convoy can determine vehicle actions to perform that include: notifying a lead vehicle in the convoy. The selected autonomous vehicle can communicate with the lead vehicle to send data indicative of the vehicle command(s) to stop, and wait for a decision from the lead vehicle. If a human operator in the lead vehicle decides to remove the selected autonomous vehicle from the convoy, then the human operator can send vehicle command(s) to remove the selected autonomous vehicle from the convoy and rearrange the convoy to continue without the selected autonomous vehicle. Alternatively, if the selected autonomous vehicle is unable to send the data and/or receive vehicle command(s) (e.g., because of a communications fault or error), or if the wait time exceeds a threshold value, then the selected autonomous vehicle can automatically perform the stopping action.

In some implementations, one or more vehicles in a convoy can be added to the convoy, and the convoy can be rearranged to incorporate the one or more vehicles.

As an example, the convoy can include a first vehicle that is configured as a lead vehicle, a second vehicle configured to follow the first vehicle, a third vehicle configured to follow the second vehicle, and a fourth vehicle configured to follow the third vehicle. A fifth vehicle that is not in the convoy can attempt to join the convoy by sending a request to the lead vehicle. If a human operator in the lead vehicle decides to add the fifth vehicle to the convoy, then the human operator can send vehicle command(s) to add the fifth vehicle to the convoy. In particular, the human operator can send vehicle command(s) to the fifth vehicle to follow the fourth vehicle. Alternatively, the human operator can send vehicle command(s) to the fifth vehicle to follow the third vehicle, and send vehicle command(s) to the fourth vehicle to follow the fifth vehicle. Alternatively, the human operator can send vehicle command(s) to the fifth vehicle to follow the second vehicle, and send vehicle command(s) to the third vehicle to follow the fifth vehicle. Alternatively, the human operator can send vehicle command(s) to the fifth vehicle to follow the first vehicle, and send vehicle command(s) to the second vehicle to follow the fifth vehicle.

As another example, a selected autonomous vehicle in a first convoy can receive vehicle command(s) to stop from a third-party entity. In response, the selected autonomous vehicle can be removed from the first convoy so that the selected autonomous vehicle can come to a stop and the first convoy can continue without the selected autonomous vehicle. Once the reason for the stop is resolved (e.g., an inspection is completed, one or more tires are inflated, etc.), the selected autonomous vehicle can attempt to rejoin the first convoy if it can safely catch up to the first convoy. The selected autonomous vehicle can send a request to join/rejoin the first convoy to the lead vehicle. A human operator in the lead vehicle can decide whether to add the selected autonomous vehicle to the first convoy. If the human operator decides to add the selected autonomous vehicle, then the human operator can send vehicle command(s) instructing the selected autonomous vehicle to follow a vehicle in the first convoy.

As another example, a selected autonomous vehicle in a first convoy can receive vehicle command(s) to stop from a third-party entity. In response, the selected autonomous vehicle can be removed from the first convoy so that the selected autonomous vehicle can come to a stop and the first convoy can continue without the selected autonomous vehicle. Once a reason for the stop is resolved, the selected autonomous vehicle can attempt to join a second convoy. The selected autonomous vehicle can send a request to join the second convoy to the lead vehicle in the second convoy. A human operator in the lead vehicle can decide whether to add the selected autonomous vehicle to the second convoy. If the human operator decides to add the selected autonomous vehicle, then the human operator can send vehicle command(s) instructing the selected autonomous vehicle to follow a vehicle in the second convoy.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104. The system 100 can also include one or more vehicle(s) 105, each including a respective vehicle computing system (not shown).

In some implementations, the system 100 can include one or more remote computing system(s) 103 that are remote from the vehicle 104 and the vehicle(s) 105. The remote computing system(s) 103 can include an operations computing system 120, one or more client computing system(s) 122, and one or more third-party computing system(s) 124. The remote computing system(s) 103 can be separate from one another or share computing device(s).

In some implementations, the vehicle 104 can be part of a fleet of vehicles operated by the operations computing system 120. The fleet of vehicles can also include the vehicle(s) 105.

The operations computing system 120 can operate the vehicle 104 via the vehicle computing system 102, and operate the vehicle(s) 105 via the respective vehicle computing system for each vehicle. The operations computing system 120 can obtain data indicative of a vehicle service request from a client, for example, via the client computing system 122. The operations computing system 120 can select the vehicle 104 (or one of the vehicle(s) 105) to provide the vehicle service for the client.

The vehicles 104 incorporating the vehicle computing system 102, and the vehicle(s) 105, can be a ground-based autonomous vehicle (e.g., car, truck, bus), an air-based autonomous vehicle (e.g., airplane, drone, helicopter, or other aircraft), or other type of vehicle (e.g., watercraft). The vehicle 104, and vehicle(s) 105, can be an autonomous vehicle that can drive, navigate, operate, etc. with minimal and/or no interaction from a human driver.

The vehicle computing system 102 can include one or more computing device(s) located on-board the vehicle 104 (e.g., located on and/or within the vehicle 104). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 104 (e.g., its computing system, one or more processors, etc.) to perform operations and functions, such as those described herein.

In some implementations, the vehicle computing system 102 can include a Vehicle API client that can enable bidirectional communication with a remote computing system 103 (e.g., operations computing system 120, client computing system(s) 122, third-party computing system(s) 124) and/or a vehicle computing system onboard each of the vehicle(s) 105 through a Vehicle API Platform operating on the remote computing system 103 and/or the vehicle computing system onboard each of the vehicle(s) 105. For example, the Vehicle API Platform and the Vehicle API client can provide for establishing communication tunnels between the vehicle computing system 102 and the remote computing system 103 and/or the vehicle computing system onboard each of the vehicle(s) 105. In some implementations, the Vehicle API client can provide for communicating data using intelligent quality of service (QoS), multiplexing data over different communication streams, prioritizing and/or de-prioritizing data traffic dynamically, for example, based on link conditions and/or the like.

As shown in FIG. 1, the vehicle 104 can include one or more sensors 108, an autonomy computing system 110, a vehicle control system 112, a communications system 114, and a memory system 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 109 associated with one or more objects that are proximate to the vehicle 104 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 109 can include image data, radar data, LIDAR data, and/or other data acquired by the sensor(s) 108. The object(s) can include, for example, pedestrians, vehicles, bicycles, and/or other objects. The object(s) can be located in front of, to the rear of, and/or to the side of the vehicle 104. The sensor data 109 can be indicative of locations associated with the object(s) within the surrounding environment of the vehicle 104 at one or more times. The sensor(s) 108 can provide the sensor data 109 to the autonomy computing system 110.

Figure 2:
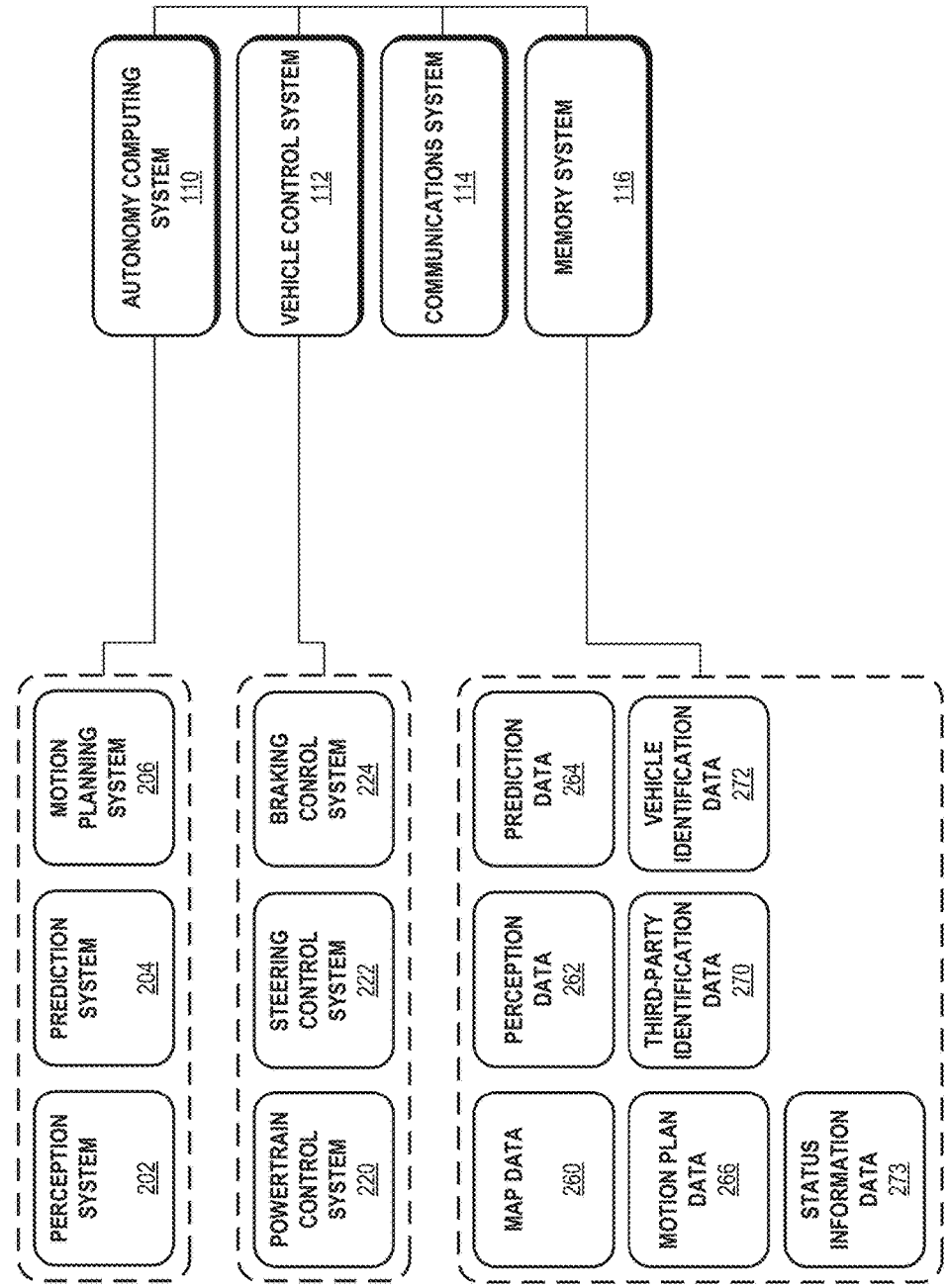
FIG. 2 depicts a block diagram of an example vehicle computing system according to example embodiments of the present disclosure.

As shown in diagram 200 of FIG. 2, the autonomy computing system 110 can include a perception system 202, a prediction system 204, a motion planning system 206, and/or other systems that cooperate to perceive the surrounding environment of the vehicle 104 and determine a motion plan for controlling the motion of the vehicle 104 accordingly. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. The autonomy computing system 110 can control the one or more vehicle control systems 112 to operate the vehicle 104 according to the motion plan.

The autonomy computing system 110 can identify one or more objects that are proximate to the vehicle 104 based at least in part on the sensor data 109 and/or the map data 260. For instance, the perception system 202 can perform various processing techniques on the sensor data 109 to determine perception data 262 that is descriptive of a current state of one or more object(s) that are proximate to the vehicle 104. The prediction system 204 can create prediction data 264 associated with each of the respective one or more object(s) proximate to the vehicle 104. The prediction data 264 can be indicative of one or more predicted future locations of each respective object. The motion planning system 206 can determine a motion plan for the vehicle 104 based at least in part on the prediction data 264 (and/or other data), and save the motion plan as motion plan data 266. The motion plan data 266 can include vehicle actions with respect to the object(s) proximate to the vehicle 104 as well as the predicted movements. The motion plan data 266 can include a planned trajectory, speed, acceleration, etc. of the vehicle 104.

The motion planning system 206 can provide at least a portion of the motion plan data 266 that indicates one or more vehicle actions, a planned trajectory, and/or other operating parameters to the vehicle control system 112 to implement the motion plan for the vehicle 104. For instance, the vehicle 104 can include a mobility controller configured to translate the motion plan data 266 into instructions. By way of example, the mobility controller can translate the motion plan data 266 into instructions to adjust the steering of the vehicle 104 "X" degrees, apply a certain magnitude of braking force, etc. The mobility controller can send one or more control signals to the responsible vehicle control sub-system (e.g., powertrain control system 220, steering control system 222, braking control system 224) to execute the instructions and implement the motion plan.

The communications system 114 can allow the vehicle computing system 102 (and its computing system(s)) to communicate with one or more other computing systems (e.g., remote computing system(s) 103, additional vehicle(s) 105). The vehicle computing system 102 can use the communications system 114 to communicate with one or more remote computing system(s) 103 (e.g., operations computing system 120, third-party computing system(s) 124) or a vehicle computing system onboard each of the vehicle(s) 105 over one or more networks (e.g., via one or more wireless signal connections). In some implementations, the vehicle computing system 102 can communicate with the operations computing system 120 over one or more wide-area networks (e.g., satellite network, cellular network, etc.) that use a relatively low-frequency spectrum and/or that are associated with relatively long-range communications. In some implementations, the vehicle computing system 102 can communicate with the third-party computing system(s) 124 over one or more local-area networks (e.g., WiFi networks, infrared or laser based communication networks, ad-hoc mesh networks, etc.) that use a relatively high-frequency spectrum and/or are associated with a relatively short-range communications. In some implementations, the communications system 114 can allow communication among one or more of the system(s) on-board the vehicle 104. The communications system 114 can include any suitable sub-systems for interfacing with one or more network(s), such as, for example, transmitters, receivers, ports, controllers, antennas, and/or other suitable sub-systems that can help facilitate communication.

The memory system 116 of the vehicle 104 can include one or more memory devices located at the same or different locations (e.g., on-board the vehicle 104, distributed throughout the vehicle 104, off-board the vehicle 104, etc.). The vehicle computing system 102 can use the memory system 116 to store and retrieve data/information. For instance, the memory system 116 can store map data 260, perception data 262, prediction data 264, motion plan data 266, third-party identification data 270, vehicle identification data 272, and status information data 273.

The map data 260 can include information regarding: an identity and location of different roadways, road segments, buildings, or other items or objects (e.g., lampposts, crosswalks, curbing, etc.); a location and direction of traffic lanes (e.g., the location and direction of a parking lane, a turning lane, a bicycle lane, or other lanes within a particular roadway or other travel way and/or one or more boundary markings associated therewith); and/or any other data that assists the vehicle computing system 102 in comprehending and perceiving its surrounding environment and its relationship thereto.

The third-party identification data 270 can include information associated with one or more third-party entities. As an example, the third-party identification data 270 can include authentication information used to authenticate a third-party entity. As another example, the third-party identification data 270 can include one or more predetermined keys that have been previously shared between the vehicle computing system 102 and the third-party computing system(s) 124. The third-party identification data 270 can include information indicating which predetermined key is shared with which third-party computing system 124.

The vehicle identification data 272 can include information indicative of a vehicle identifier that corresponds to the vehicle 104. As an example, the vehicle identification data 272 can include an identification code corresponding to the vehicle 104 that is painted on the outside of the vehicle 104. As another example, the vehicle identification data 272 can include an algorithm to generate an identification code corresponding to the vehicle 104. Each generated identification code can be valid for a limited time, and a new identification code can be generated to replace an outdated identification code. Additionally, the vehicle 104 can include a display board that displays a valid identification code at any given time.

The status information data 273 can include status information associated with the vehicle 104. The status information data 273 can be generated by the vehicle computing system 102 periodically, or in response to vehicle command(s) from a third-party entity. The status information can include a status associated with one or more component(s) of the vehicle 104, and/or an overall health/status associated with the vehicle 104.

Figure 3:
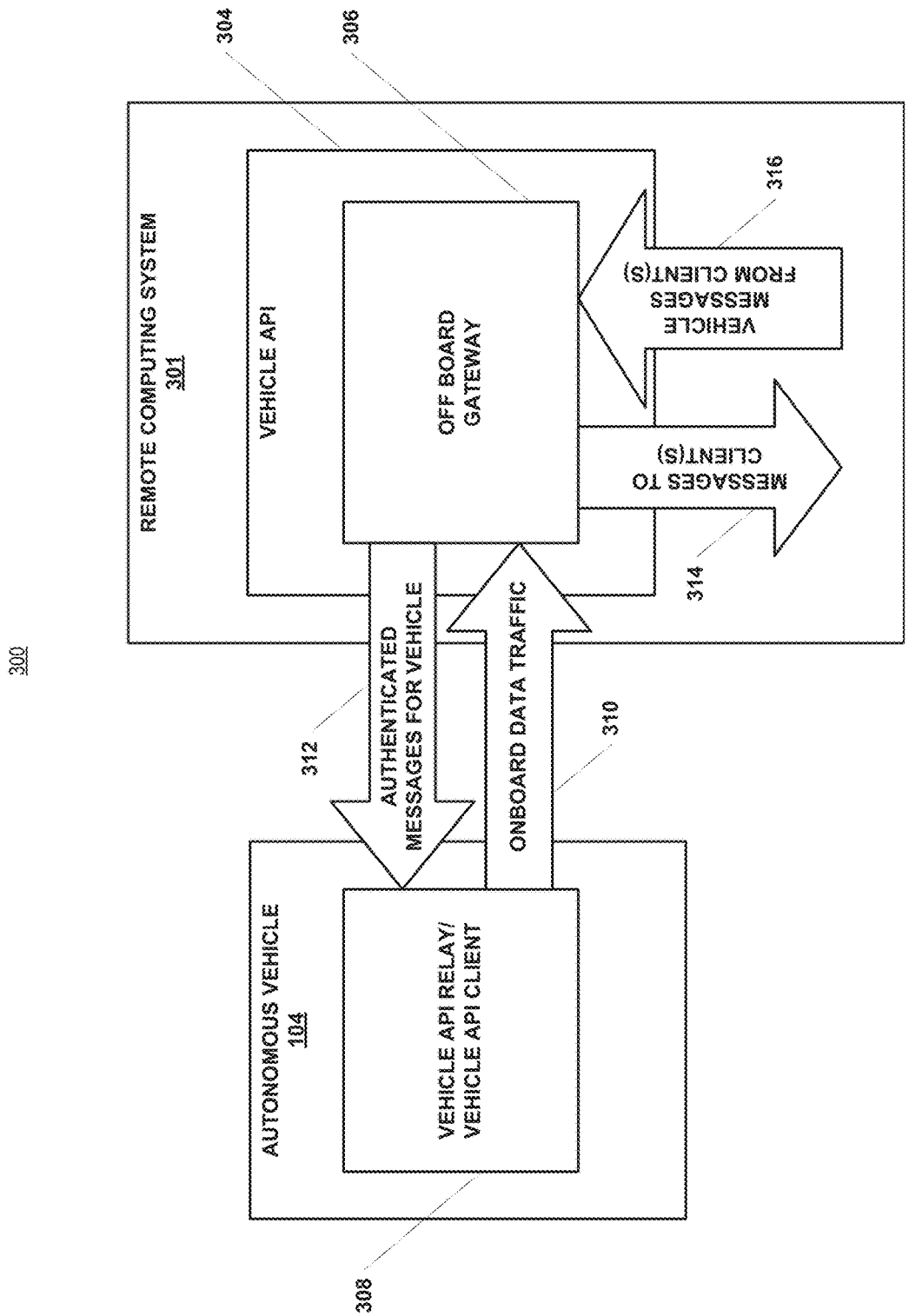
FIG. 3 depicts a block diagram of an example vehicle remote computing system interface according to example embodiments of the present disclosure.

As illustrated in FIG. 3, the vehicle-operations system interface 300 can include a Vehicle API 304 associated with a remote computing system 301 (e.g., remote computing system(s) 103, vehicle computing system onboard each of the vehicle(s) 105, etc.). The Vehicle API 304 can provide for a translation/transport layer as an interface between vehicle computing systems onboard vehicles within an entity's fleet (e.g., vehicle 104, additional vehicle(s) 105) and one or more remote clients and/or applications operating within the remote computing system 301.

The Vehicle API 304 can include an offboard gateway 306 which can provide for establishing one or more communication channels between the Vehicle API 304 and a vehicle, such as vehicle 104 (e.g., via vehicle computing system 102, etc.). The offboard gateway 306 can establish multiplexing connections between the vehicle 104 and the Vehicle API 304 that can be used to send arbitrary communications through the same connections.

In some implementations, the Vehicle API 304, through offboard gateway 306, can provide for establishing multiple hypertext transfer protocol (or other suitable protocol) connections, for example, using HTTP/2, between a Vehicle API relay/client 308 and the offboard gateway 306, allowing the ability to parallelize and assert traffic priority within a connection. In some implementations, the offboard gateway 306 of Vehicle API 304 can establish at least two hypertext transfer protocol (or other suitable protocol) connections, such as HTTP/2 connections, to the operations computing system from a vehicle, where at least one connection can be dedicated to high reliability, high deliverability traffic and at least one connection can be dedicated to best-effort, unguaranteed traffic. In some implementations, the use of multiple connections can allow for the underlying transport to be controlled in terms of different connections having different weights such that data can be identified as more important.

The vehicle 104 can include a Vehicle API relay/client 308, for example, associated with a vehicle computing system 102, which can provide for establishing the one or more communication channels between the offboard gateway 306 of the Vehicle API 304 and the vehicle 104. In some implementations, the Vehicle API relay/client 308 onboard the vehicle 104 can provide for communicating data using intelligent quality of service (QoS), multiplexing data over different communication streams, prioritizing and/or de-prioritizing data traffic dynamically, for example, based on link conditions and/or the like. In some implementations, the Vehicle API relay/client 308 can provide for making determinations about what data it thinks is more important and handling the communication of that data as appropriate.

In some implementations, the Vehicle API 304, through offboard gateway 306 and Vehicle API relay/client 308, can provide for communicating onboard data traffic 310 (e.g., telemetry, vehicle state information, etc.) from the vehicle 104 to the remote computing system 301. For example, the offboard gateway 306 can receive the onboard data traffic 310 from the Vehicle API relay/client 308 and the Vehicle API 304 can provide for handling the onboard data traffic 310 and providing the onboard data traffic 310 to one or more clients and/or application associated with the remote computing system 301 in client messages 314.

In some implementations, the Vehicle API 304, through offboard gateway 306 and Vehicle API relay/client 308, can provide for communicating authenticated vehicle messages 312 from the remote computing system 301 to the vehicle 104 (e.g., to vehicle computing system 102, etc.). For example, the offboard gateway 306 can receive vehicle messages 316 from one or more clients/applications associated with the remote computing system 301 (e.g., messages signed by the client to allow for authenticating the messages before sending to a vehicle) and the Vehicle API 304 can provide for communicating the vehicle messages 316 to the vehicle 104, through offboard gateway 306 and Vehicle API relay/client 308, as authenticated vehicle messages 312 (e.g., once the Vehicle API 304 has authenticated the signed vehicle messages 316).

In some implementations, the Vehicle API 304 can allow for a vehicle 104 to send multiple types of data to the remote computing system 301 over the established connections with the vehicle 104. For instance, in some implementations, the Vehicle API 304 can provide for a vehicle 104 sending status information data 273 to the remote computing system 301. In some implementations, the Vehicle API 304 can provide for a vehicle 104 to send low resolution perception data, such as labels and/or geometries, to the operations computing system 120, allowing for processing the data offboard the vehicle 104 by one or more clients/applications associated with the operations computing system 120 and allowing for developing a better understanding of the world. In some implementations, the Vehicle API 304 can provide for a vehicle to send data such as current vehicle pose (e.g., global and relative to map), vehicle trajectory, onboard diagnostics, status information, and/or the like, to the remote computing system 301 to be processed by one or more clients/applications associated with the remote computing system 301.

In some implementations, the Vehicle API 304 can provide for the remote computing system 301 to receive multiple types of data from the vehicle 104 and/or additional vehicle(s) 105. For example, the Vehicle API 304 can provide for the remote computing system 301 to receive multiple types of data from the vehicle 104 over the established connections with the vehicle 104. In some implementations, the Vehicle API 304 can provide for receiving status information data 273 from the vehicle 104 at one or more times, and analyzing the status information data 273 to determine a vehicle state associated with the vehicle 104.

In some implementations, the Vehicle API 304 can provide for the remote computing system 301 to send multiple types of data to the vehicle 104 and/or additional vehicle(s) 105. For example, the Vehicle API 304 can provide for the remote computing system 301 to send multiple types of data to the vehicle 104 over the established connections to the vehicle 104. For example, in some implementations, the Vehicle API 304 can provide for sending command signals to the vehicle 104, such as, for example, sending specific vehicle command(s) to the vehicle 104, sending advisories to the vehicle 104, etc. The specific vehicle command(s) can, for example, instruct the vehicle 104 to offload the data from its computing system, instruct the vehicle 104 to go to certain geographic coordinates, instruct the vehicle 104 to report for maintenance, instruct the vehicle 104 to procure fuel, instruct the vehicle 104 to indicate a selection by the remote computing system 301, instruct the vehicle 104 to relay vehicle command(s), instruct the vehicle 104 to come to a stop, and/or the like. The advisories can, for example, notify a vehicle operator associated with the vehicle 104 about status information associated with the vehicle 104 or vehicle(s) 105, flagged geo regions (e.g., areas to avoid, areas to proceed with caution, areas under construction that should be routed around, etc.), etc.

Figure 4A:
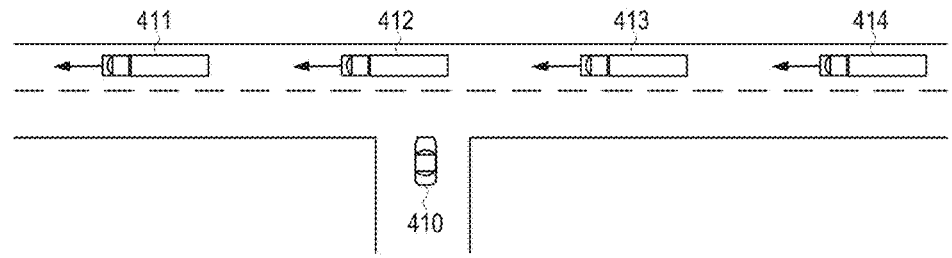
FIGS. 4A-4C depict diagrams that illustrate an example of controlling an autonomous vehicle according to example embodiments of the present disclosure.

FIG. 4A depicts a diagram of a plurality of vehicles 105 operating in an environment under the jurisdiction of a third-party entity 410. The plurality of vehicles 105 can include autonomous vehicles 411, 412, 413, and 414. In some implementations, the vehicles 411, 412, 413, and 414 can operate as a convoy. The third-party entity 410 can be associated with a third-party computing system 124, and the third-party entity 410 can send one or more vehicle command(s) to the vehicles 411, 412, 413, and/or 414, via the third-party computing system 124. The vehicle computing system(s) corresponding to the vehicles 411, 412, 413, and/or 414 can perform one or more vehicle action(s) in response to receiving the vehicle command(s).

As an example, the third-party entity 410 can send vehicle command(s) to select the vehicle 411. In response to receiving the vehicle command(s), the vehicle 411 can be configured as being selected, and perform vehicle action(s) to indicate the selection. The vehicle 411 can flash an external indicator light, display a message on an external display, and/or perform other vehicle action(s) that the third-party entity 410 can perceive to determine that the vehicle 411 is selected.

As another example, the third-party entity 410 can broadcast vehicle command(s) in a general direction toward the vehicles 411, 412, 413, and 414. If the third-party entity 410 broadcasts vehicle command(s) in order to select the vehicle 411 and the vehicle 412 receives the vehicle command(s), then the vehicle 412 can perform vehicle action(s) to indicate selection of the vehicle 412. The third-party entity 410 can perceive the vehicle action(s) and determine that the vehicle 412 is selected. The third-party entity 410 can broadcast vehicle command(s) instructing the vehicle 412 to relay future vehicle command(s) to an autonomous vehicle in front of the vehicle 412. In response to receiving the vehicle command(s), the vehicle 412 can communicate with the vehicle 411 and relay the future vehicle command(s) from the third-party entity 410 to the vehicle 411.

As another example, the third-party entity 410 can broadcast vehicle command(s) in a general direction toward the vehicles 411, 412, 413, and 414. If the vehicle command(s) include a vehicle identifier corresponding to the vehicle 411, and the vehicle 412 receives the vehicle command(s), then the vehicle 412 can ignore the vehicle command(s). Alternatively, the vehicle 412 can determine that the vehicle 411 is proximate to the vehicle 412, and the vehicle 412 can relay the vehicle command(s) to the vehicle 411.

As another example, the third-party entity 410 can determine that the vehicle 411 has low tire pressure, and send vehicle command(s) selecting the vehicle 411. The vehicle command(s) can include low tire pressure as the reason for the selection, and instruct the vehicle 411 to provide information indicating the reason to a service provider. In response, the vehicle 411 can communicate with the operations computing system 120 to send data indicative of the reason for the selection.

As another example, the third-party entity can determine that the vehicle 411 appears to have low tire pressure, and send vehicle command(s) selecting the vehicle 411 and instructing the vehicle 411 to provide status information indicative of its tire pressure. In response, the vehicle 411 can retrieve the status information from the status information data 273, or generate the status information, and send the status information to the third-party entity 410. The third-party entity can verify the tire pressure of the vehicle 411 based on the status information and send vehicle command(s) instructing the vehicle 411 to travel to a maintenance area if the tire pressure is low.

As another example, the third-party entity can send vehicle command(s) selecting the vehicle 411 and instructing the vehicle 411 to stop. In response, the vehicle 411 can perform a stopping action to come to a stop. If the vehicle command(s) include a reason for stopping the vehicle 411, then the vehicle 411 can perform a safe-stop action if the reason is determined not to be critical, or the vehicle 411 can perform an emergency-stop action if the reason is determined to be critical. If the vehicle command(s) include an associated priority level (e.g., low-priority, high-priority), then the vehicle 411 can perform a stopping action corresponding to the priority level.

As another example, the third-party entity 410 can send one or more encrypted vehicle command(s) to the vehicle 411. The vehicle 411 can receive the encrypted vehicle command(s), and decrypt the vehicle command(s) using a predetermined key that was previously shared between the vehicle 411 and the third-party entity 410. The vehicle 411 can retrieve the third-party identification data 270 to authenticate the third-party entity 410. If the third-party entity 410 is authenticated, then the vehicle 411 can perform vehicle action(s) in response to the vehicle command(s) from the third-party entity 410.

Figure 4B:
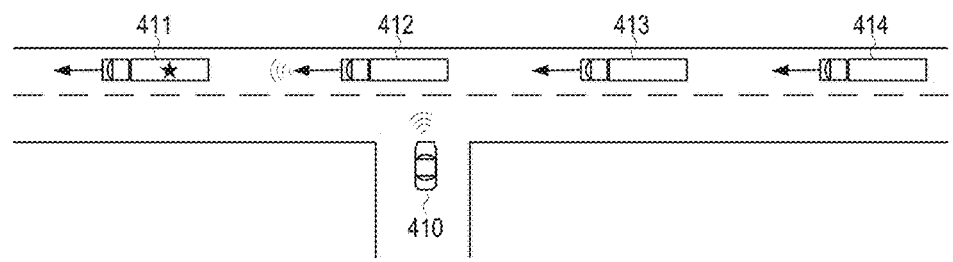

FIG. 4B depicts a diagram of a plurality of vehicles 105 operating in an environment under the jurisdiction of a third-party entity 410. The plurality of vehicles 105 can include autonomous vehicles 411, 412, 413, and 414. In some implementations, the vehicles 411, 412, 413, and 414 can operate as a convoy. The third-party entity 410 can identify the vehicle 411, and send vehicle command(s) that include a vehicle identifier corresponding to the vehicle 411. The vehicle computing system associated with the vehicle 412 can receive the vehicle command(s) and determine that the vehicle identifier included in the vehicle command(s) does not correspond to the vehicle 412. In some implementations, the vehicle computing system can determine that the vehicle identifier included in the vehicle command(s) corresponds to the vehicle 411, and that the vehicle 411 is proximate to the vehicle 412. The vehicle computing system can control the vehicle 412 to data indicative of the vehicle command(s) to the vehicle 411.

Figure 4C:
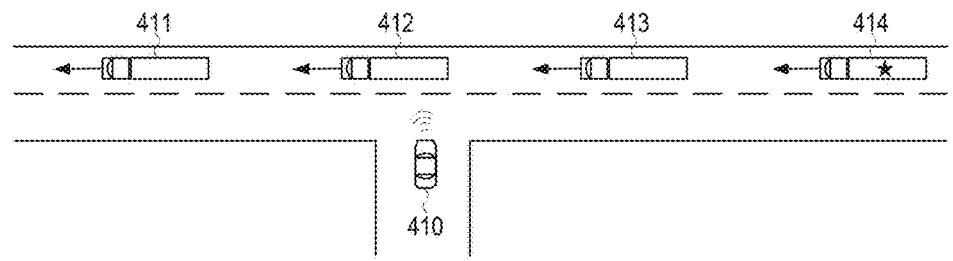

FIG. 4C depicts a diagram of a plurality of vehicles 105 operating in an environment under the jurisdiction of a third-party entity 410. The plurality of vehicles 105 can include autonomous vehicles 411, 412, 413, and 414. In some implementations, the vehicles 411, 412, 413, and 414 can operate as a convoy. The third-party entity 410 can identify the vehicle 414, and send vehicle command(s) that include a vehicle identifier corresponding to the vehicle 414. The vehicle computing system associated with the vehicle 412 can receive the vehicle command(s) and determine that the vehicle identifier included in the vehicle command(s) does not correspond to the vehicle 412. In some implementations, the vehicle computing system can determine that the vehicle identifier included in the vehicle command(s) corresponds to the vehicle 414, and that the vehicle 414 is not proximate to the vehicle 412. The vehicle computing system associated with the vehicle 412 can discard the vehicle command(s) that include the vehicle identifier corresponding to the vehicle 414.

Figure 5A:
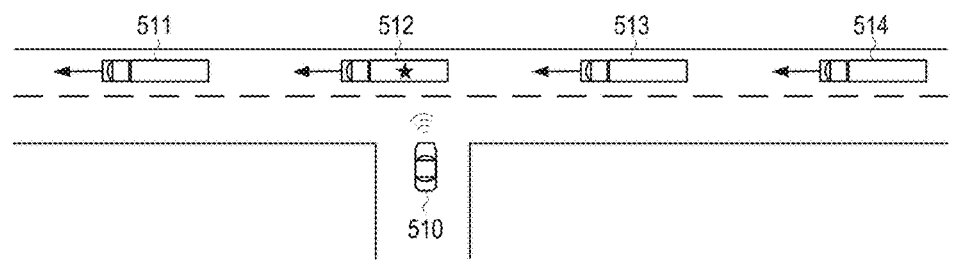
FIGS. 5A and 5B depict diagrams that illustrate an example of controlling an autonomous vehicle according to example embodiments of the present disclosure.

FIG. 5A depicts a diagram of a plurality of vehicles 105 operating in an environment under the jurisdiction of a third-party entity 510. The plurality of vehicles 105 can include autonomous vehicles 511, 512, 513, and 514. In some implementations, the vehicles 511, 512, 513, and 514 can operate as a convoy. The third-party entity 510 can send one or more vehicle command(s) to select the vehicle 512. In response, the vehicle computing system associated with the vehicle 512 can control the vehicle 512 to flash its hazard lights so that the third-party entity 510 can verify that the vehicle 512 is selected.

Figure 5B:
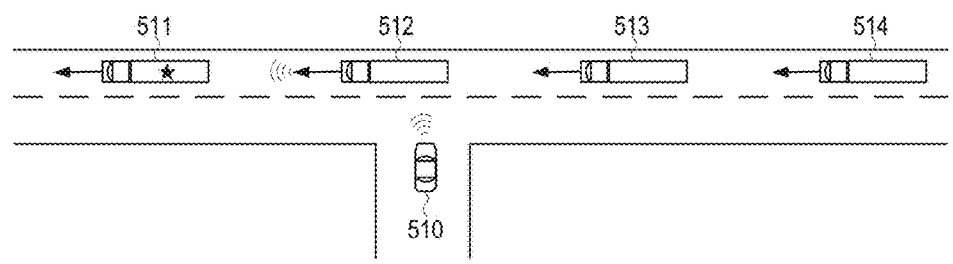

FIG. 5B depicts a diagram of a plurality of vehicles 105 operating in an environment under the jurisdiction of a third-party entity 510. The plurality of vehicles 105 can include autonomous vehicles 511, 512, 513, and 514. In some implementations, the vehicles 511, 512, 513, and 514 can operate as a convoy. The third-party entity 510 can send vehicle command(s) to the vehicle 512 indicating a selection of the vehicle 511. In response, the vehicle computing system associated with the vehicle 512 can communicate with the vehicle computing system associated with the vehicle 511 to indicate a selection of the vehicle 511 by third-party entity 510. In response, the vehicle computing system associated with the vehicle 511 can control the vehicle 511 to flash its hazard lights so that the third-party entity 510 can verify that the vehicle 511 is selected.

Figure 6:
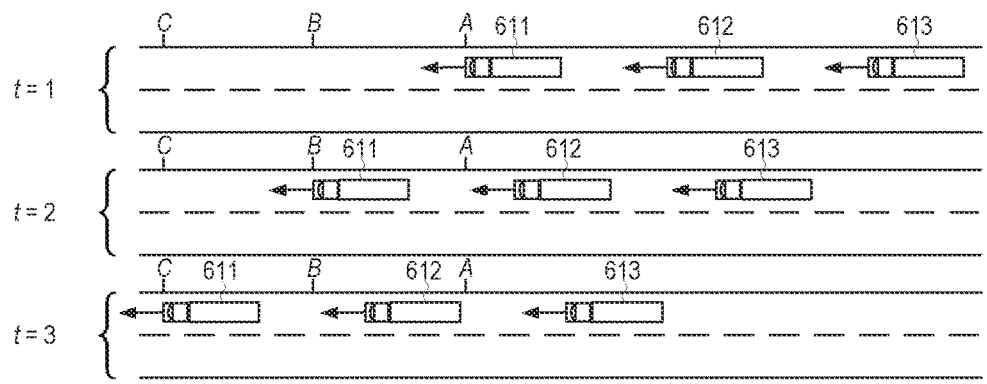
FIG. 6 depicts a diagram that illustrates an example of controlling an autonomous vehicle according to example embodiments of the present disclosure.

FIG. 6 depicts a diagram of a plurality of vehicles 105 including vehicles 611, 612, and 613 operating as a convoy. The vehicle 611 can be configured as the lead vehicle in the convoy, and vehicles 612 and 613 can be configured as follower vehicles. The vehicle 612 can be configured to follow vehicle 611 at a first distance ($d_1$), and vehicle 613 can be configured to follow vehicle 612 at the first distance ($d_1$). The vehicles 611, 612, and 613 can be configured to travel at a first velocity ($v_1$).

At a first time (t=1), vehicle 611 can be positioned at a first location marker (A), vehicle 612 can be positioned at the first distance ($d_1$) behind vehicle 611, and vehicle 613 can be positioned at the first distance ($d_1$) behind vehicle 612.

At a second time (t=2), vehicle 611 can travel to a second location marker (B), vehicle 612 can travel to maintain a position at the first distance ($d_1$) behind vehicle 611, and vehicle 613 can travel to maintain a position at the first distance ($d_1$) behind vehicle 612.

At a third time (t=3), vehicle 611 can travel to a third location marker (C), vehicle 612 can travel to maintain a position at the first distance ($d_1$) behind vehicle 611, and vehicle 613 can travel to maintain a position at the first distance ($d_1$) behind vehicle 612.

Figure 7:
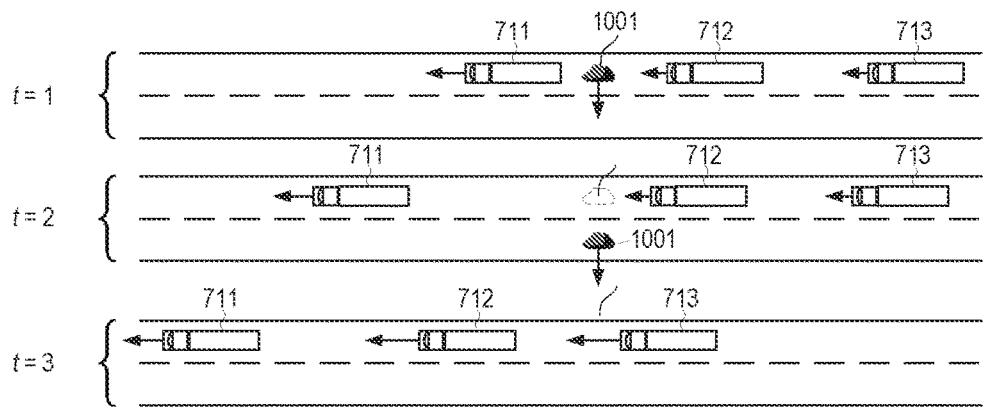
FIG. 7 depicts a diagram that illustrates an example of controlling an autonomous vehicle according to example embodiments of the present disclosure.

FIG. 7 depicts a diagram of a plurality of vehicles 105 including vehicles 711, 712, and 713 operating as a convoy. The vehicle 711 can be configured as the lead vehicle in the convoy, and vehicles 712 and 713 can be configured as follower vehicles. The vehicle 712 can be configured to follow vehicle 711 at a first distance ($d_1$), and vehicle 713 can be configured to follow vehicle 712 at the first distance ($d_1$).

At a first time (t=1), vehicle 711, 712, and 713 can travel at a first velocity ($v_1$). The vehicle 712 can follow vehicle 711 at the first distance ($d_1$), and the vehicle 713 can follow vehicle 712 at the first distance ($d_1$).

At a second time (t=2), vehicle 712 can detect an obstacle 1001 in front of the vehicle, and generate a motion plan to avoid hitting the obstacle 1001. The motion plan of vehicle 712 can include reducing speed to a second velocity ($v_2>v_1$). The vehicle 711 can continue to travel at the first velocity ($v_1$).

The vehicle 713 can generate a motion plan to maintain a position at the first distance ($d_1$) behind vehicle 712, and to avoid hitting the vehicle 712. The motion plan of vehicle 713 can include reducing speed to the second velocity ($v_2$). In some implementations, vehicle 712 can communicate with vehicle 713 to provide data indicative of the obstacle 1001 and the motion plan of vehicle 712. The vehicle 713 can receive the data and generate the motion plan of vehicle 713 based in part on the received data. In some implementations, vehicle 713 can detect that vehicle 712 that is in front of vehicle 713 is slowing down. The vehicle 713 can generate the motion plan of vehicle 713 based in part on the detected slow down.

At a third time (t=3), vehicle 712 can determine that the obstacle 1001 is clear, but that vehicle 712 is now a second distance ($d_2 > d_1$) behind vehicle 711. The vehicle 712 can generate a motion plan to resume a position at the first distance ($d_1$) behind vehicle 711. The motion plan of vehicle 712 can include increasing speed to a third velocity ($v_3 > v_1$) to reduce a follow distance of vehicle 712 behind vehicle 711.

The vehicle 713 can generate a motion plan to maintain a position at the first distance ($d_1$) behind vehicle 712. The motion plan of vehicle 713 can include increasing speed to the third velocity ($v_3$). In some implementations, vehicle 712 can communicate with vehicle 713 to provide data indicative of the motion plan of vehicle 712. The vehicle 713 can receive the data and generate the motion plan of vehicle 713 based in part on the received data. In some implementations, vehicle 713 can detect that vehicle 712 that is in front of vehicle 713 is speeding up. The vehicle 713 can generate the motion plan of vehicle 713 based in part on the detected speed up.

Figure 8:
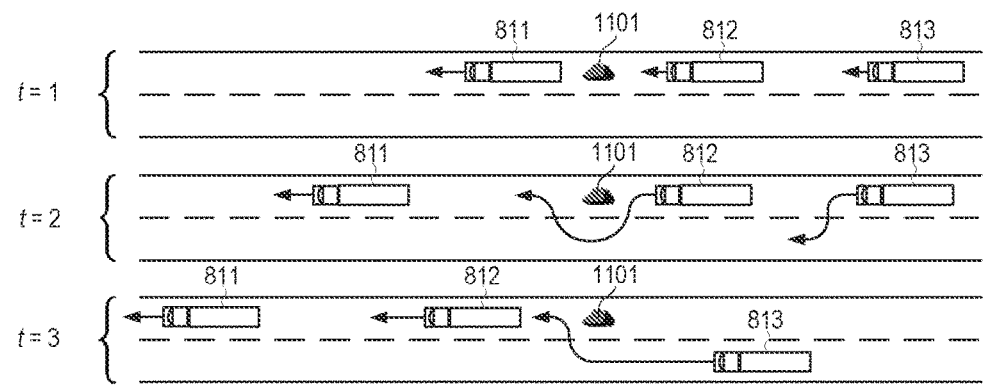
FIG. 8 depicts a diagram that illustrates an example of controlling an autonomous vehicle according to example embodiments of the present disclosure.

FIG. 8 depicts a diagram of a plurality of vehicles 105 including vehicles 811, 812, and 813 operating as a convoy. The vehicle 811 can be configured as the lead vehicle in the convoy, and vehicles 812 and 813 can be configured as follower vehicles. The vehicle 812 can be configured to follow vehicle 811 at a first distance ($d_1$), and vehicle 813 can be configured to follow vehicle 812 at the first distance ($d_1$).

At a first time (t=1), vehicle 811, 812, and 813 can travel at a first velocity ($v_1$). The vehicle 812 can follow vehicle 811 at the first distance ($d_1$), and the vehicle 813 can follow vehicle 812 at the first distance ($d_1$).

At a second time (t=2), vehicle 812 can detect an obstacle 1101 in front of the vehicle, and generate a motion plan to avoid hitting the obstacle 1101. The motion plan of vehicle 812 can include reducing speed, and moving to a different travel lane. The vehicle 811 can continue to travel at the first velocity ($v_1$).

The vehicle 812 can communicate with vehicle 813 to provide data indicative of the obstacle 1101 and the motion plan of vehicle 812. The vehicle 813 can receive the data and generate a motion plan of vehicle 813 based in part on the received data. The vehicle 813 can generate the motion plan to try and maintain a position at the first distance ($d_1$) behind vehicle 812, avoid hitting the vehicle 812, and avoid hitting the obstacle 1101. The motion plan of vehicle 813 can include reducing speed, and moving to a different travel lane.

At a third time (t=3), vehicle 812 can determine that the obstacle 1101 is clear, but that vehicle 812 is now a second distance ($d_2 > d_1$) behind vehicle 811. The vehicle 812 can generate a motion plan to maintain a position at the first distance ($d_1$) behind vehicle 811. The motion plan of vehicle 812 can include increasing speed to a second velocity ($v_2 > v_1$) to reduce a follow distance of vehicle 812 behind vehicle 811.

Additionally, vehicle 813 can determine that it is a third distance ($d_3 > d_1$) behind vehicle 812. The vehicle 813 can generate a motion plan to maintain a position at the first distance ($d_1$) behind vehicle 812. The motion plan of vehicle 813 can include increasing speed to a third velocity ($v_3 > v_1$) to reduce a follow distance of vehicle 813 behind vehicle 812.

Figure 9:
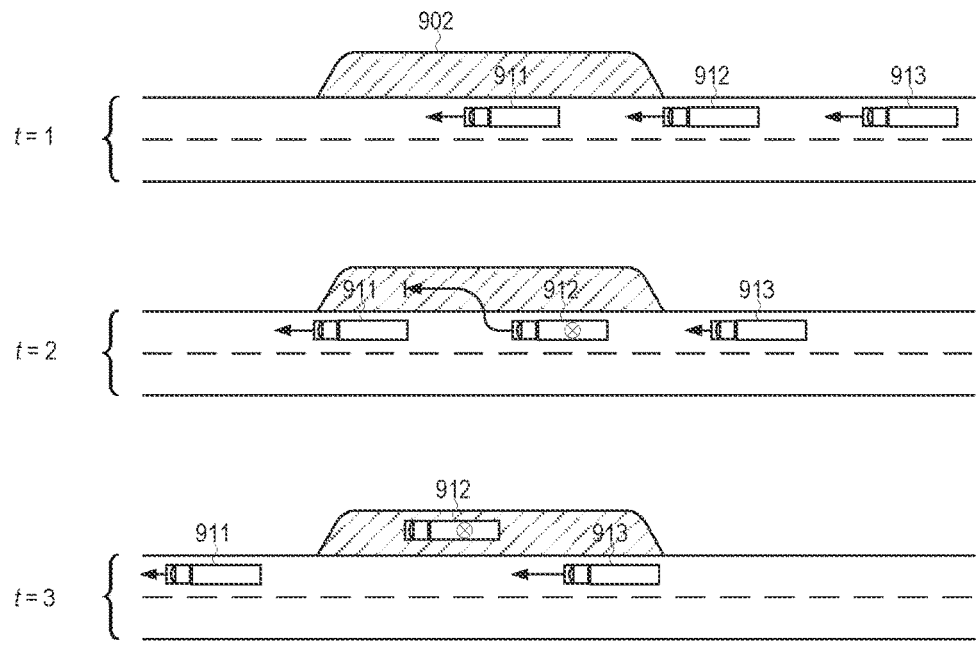
FIG. 9 depicts a diagram that illustrates an example of controlling an autonomous vehicle according to example embodiments of the present disclosure.

FIG. 9 depicts a diagram of a plurality of vehicles 105 including vehicles 911, 912, and 913 operating as a convoy in an environment under the jurisdiction of a third-party entity (not shown). The vehicle 911 can be configured as the lead vehicle in the convoy, and vehicles 912 and 913 can be configured as follower vehicles. The vehicle 912 can be configured to follow vehicle 911, and vehicle 913 can be configured to follow vehicle 912.

At a first time (t=1), vehicles 911, 912, and 913 can travel as a group. The vehicle 912 can receive one or more vehicle command(s) from the third-party entity. The vehicle command(s) can instruct vehicle 912 to stop. The vehicle command(s) can include or otherwise indicate a low-priority for the stop. In response to the vehicle command(s), the vehicle 912 can determine one or more vehicle action(s) to perform. The vehicle action(s) can include, for example, continuing to travel with the convoy until a safe stopping location is identified, removal from the convoy, and a safe-stop action.

At a second time (t=2), vehicle 912 can identify the safety lane 1202 as a safe stopping location. The vehicle 912 can send data indicative of the vehicle command(s) from the third-party entity and the determined vehicle action(s) to vehicles 911 and 913, and generate a motion plan to come to a stop in the safety lane 902. A human operator in the vehicle 911 can verify the vehicle command(s) and confirm the vehicle action(s) by sending one or more vehicle command(s) to remove vehicle 912 from the convoy. In particular, vehicle 913 can be configured to follow vehicle 911.

At a third time (t=3), vehicle 912 can come to a stop in the safety lane 902. The vehicle 911 can slow down and/or vehicle 913 can speed up so that vehicle 913 can maintain a predetermined follow distance behind vehicle 911.

Figure 10:
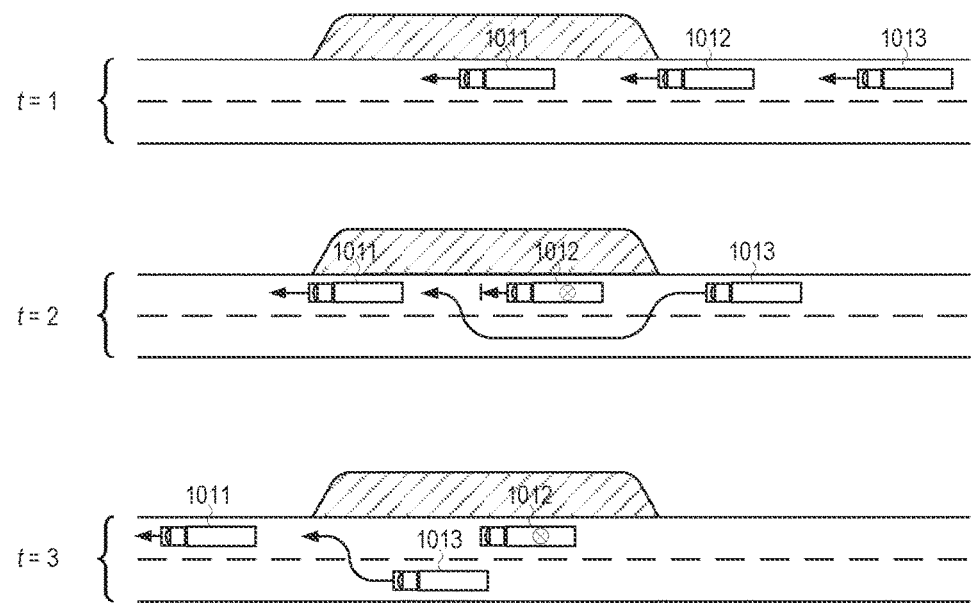
FIG. 10 depicts a diagram that illustrates an example of controlling an autonomous vehicle according to example embodiments of the present disclosure.

FIG. 10 depicts a diagram of a plurality of vehicles 105 including vehicles 1011, 1012, and 1013 operating as a convoy in an environment under the jurisdiction of a third-party entity (not shown). The vehicle 1011 can be configured as the lead vehicle in the convoy, and vehicles 1012 and 1013 can be configured as follower vehicles. The vehicle 1012 can be configured to follow vehicle 1011, and vehicle 1013 can be configured to follow vehicle 1012.

At a first time (t=1), vehicles 1011, 1012, and 1013 can travel as a group.

At a second time (t=2), vehicle 1012 can receive one or more vehicle command(s) from the third-party entity. The vehicle command(s) can instruct vehicle 1012 to stop. The vehicle command(s) can include or otherwise indicate a high-priority for the stop. In response to the vehicle command(s), the vehicle 1012 can determine one or more vehicle action(s) to perform. The vehicle action(s) can include, for example, removal from the convoy, and an emergency-stop action. The vehicle 1012 can send data indicative of the vehicle command(s) from the third-party entity and the determined vehicle action(s) to vehicles 1011 and 1013, and generate a motion plan to immediately come to a stop in the same lane that the vehicle is travelling in. A human operator in the vehicle 1011 can verify the vehicle command(s) and confirm the vehicle action(s) by sending one or more vehicle command(s) to remove vehicle 1012 from the convoy. In particular, vehicle 1013 can be configured to follow vehicle 1011. The vehicle 1013 can generate a motion plan to avoid hitting vehicle 1012 when it is stopping/stopped.

At a third time (t=3), vehicle 1012 can come to a stop. The vehicle 1011 can slow down and/or vehicle 1013 can speed up so that vehicle 1013 can maintain a predetermined follow distance behind vehicle 1011.

Figure 11:
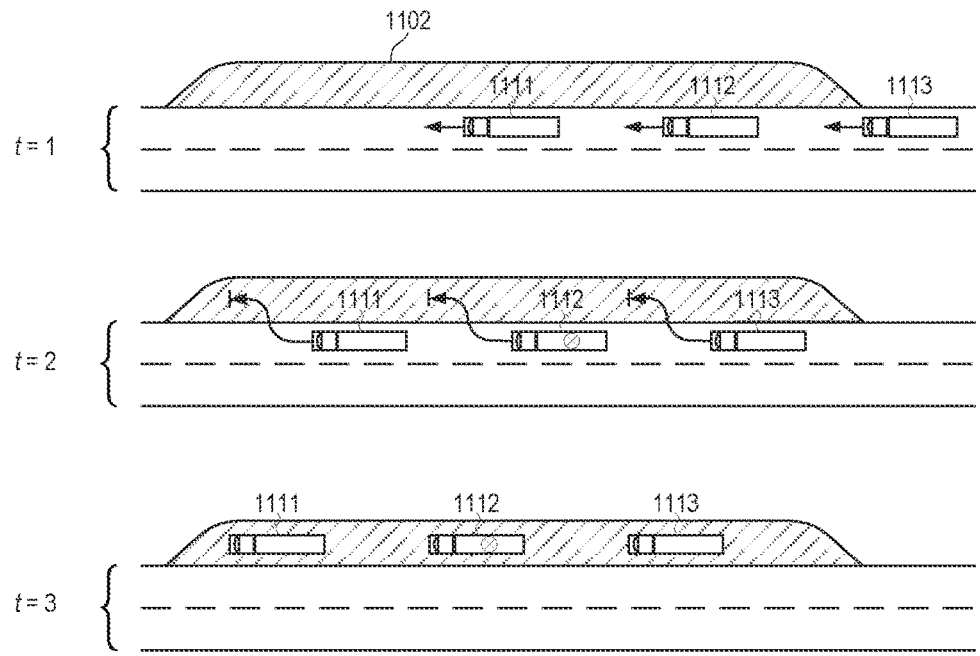
FIG. 11 depicts a diagram that illustrates an example of controlling an autonomous vehicle according to example embodiments of the present disclosure.

FIG. 11 depicts a diagram of a plurality of vehicles 105 including vehicles 1111, 1112, and 1113 operating as a convoy in an environment under the jurisdiction of a third-party entity (not shown). The vehicle 1111 can be configured as the lead vehicle in the convoy, and vehicles 1112 and 1113 can be configured as follower vehicles. The vehicle 1112 can be configured to follow vehicle 1111, and vehicle 1113 can be configured to follow vehicle 1112.

At a first time (t=1), vehicles 1111, 1112, and 1113 can travel as a group.

At a second time (t=2), vehicle 1112 can receive one or more vehicle command(s) from the third-party entity. The vehicle command(s) can instruct vehicle 1112 to stop. The vehicle command(s) can include or otherwise indicate a request for a human to be present at an inspection, or instructions for all vehicles in the convoy to stop. In response to the vehicle command(s), the vehicle 1112 can determine one or more vehicle action(s) to perform. The vehicle action(s) can include, for example, coordinating with other vehicles in the convoy to stop as a group. In particular, the vehicle 1112 can send data indicative of the vehicle command(s) from the third-party entity and the determined vehicle action(s) to vehicle 1111. A human operator in the vehicle 1111 can verify the vehicle command(s) from the third-party entity, and send one or more vehicle command(s) to determine coordinated stopping actions for all the vehicles in the convoy.

At a third time (t=3), vehicles 1111, 1112, and 1113 can perform a respective coordinated stopping action so that vehicles 1111, 1112, and 1113 can stop as a group in the safety lane 1102.

Figure 12:
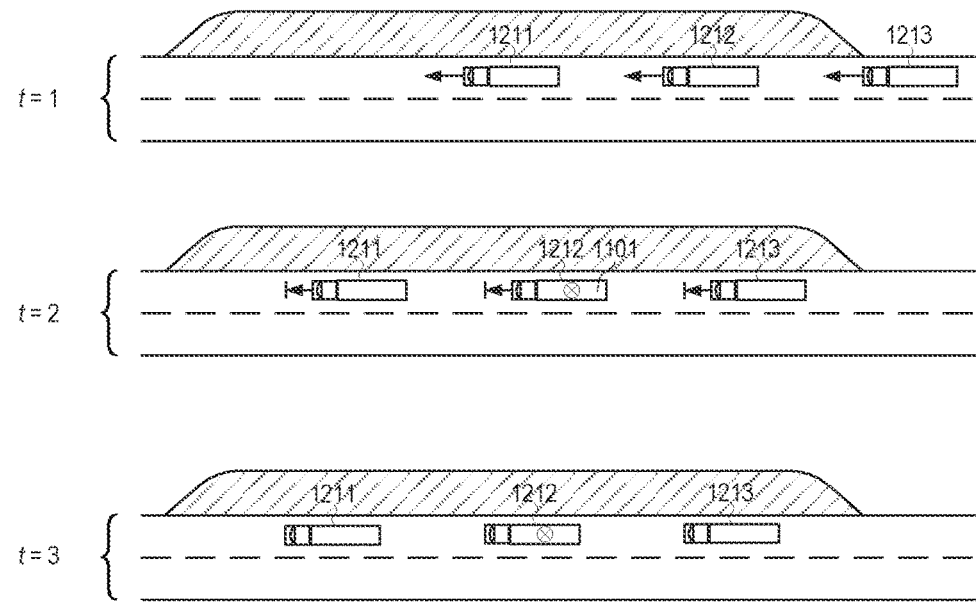
FIG. 12 depicts a diagram that illustrates an example of controlling an autonomous vehicle according to example embodiments of the present disclosure.

FIG. 12 depicts a diagram of a plurality of vehicles 105 including vehicles 1211, 1212, and 1213 operating as a convoy in an environment under the jurisdiction of a third-party entity (not shown). The vehicle 1211 can be configured as the lead vehicle in the convoy, and vehicles 1212 and 1213 can be configured as follower vehicles. The vehicle 1212 can be configured to follow vehicle 1211, and vehicle 1213 can be configured to follow vehicle 1212.

At a first time (t=1), vehicles 1211, 1212, and 1213 can travel as a group.

At a second time (t=2), vehicle 1212 can receive one or more vehicle command(s) from the third-party entity. The vehicle command(s) can instruct vehicle 1212 to stop. The vehicle command(s) can include or otherwise indicate a request for a human to be present at an inspection, or instructions for all vehicles in the convoy to stop. In response to the vehicle command(s), the vehicle 1212 can determine one or more vehicle action(s) to perform. The vehicle action(s) can include, for example, coordinating with other vehicles in the convoy to stop as a group. In particular, the vehicle 1212 can send data indicative of the vehicle command(s) from the third-party entity and the determined vehicle action(s) to vehicle 1211. A human operator in the vehicle 1211 can verify the vehicle command(s) from the third-party entity, and send one or more vehicle command(s) to determine coordinated stopping actions for all the vehicles in the convoy.

At a third time (t=3), vehicles 1211, 1212, and 1213 can perform a respective coordinated stopping action so that the convoy can stop as a group in a same lane that vehicles 1211, 1212, and 1213 are travelling in.

Figure 13:
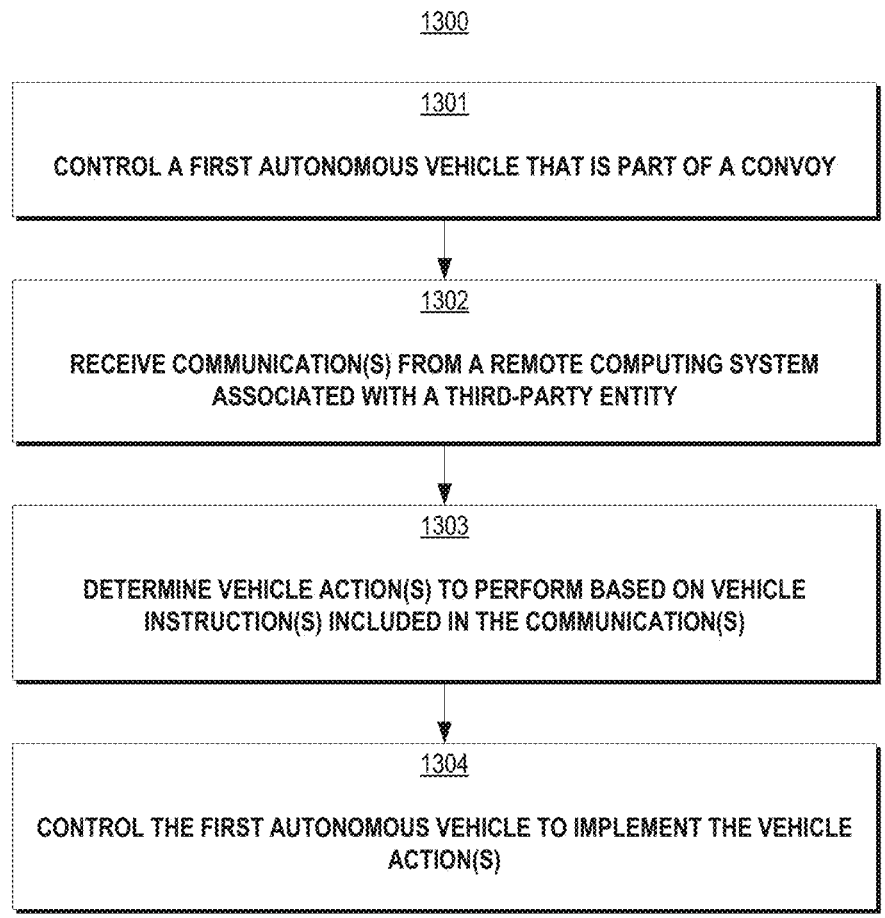
FIG. 13 depicts a flow diagram of controlling an autonomous vehicle according to example embodiments of the present disclosure.

FIG. 13 depicts a flow diagram of an example method 1300 for controlling an autonomous vehicle according to example embodiments of the present disclosure. One or more portion(s) of the method 1300 can be implemented as operations by one or more computing system(s) such as, for example, the computing system(s) 102, 120, 1401, and 1410 shown in FIGS. 1, 2, and 14. Moreover, one or more portion(s) of the method 1300 can be implemented as an algorithm on the hardware components of the system(s) described herein (e.g., as in FIGS. 1 and 14), for example, to control an autonomous vehicle in response to vehicle instructions from a remote computing system associated with a third-party entity. FIG. 13 depicts elements performed in a particular order for purposes of illustration and discussion. Those of ordinary skill in the art, using the disclosures provided herein, will understand that the elements of any of the methods (e.g., of FIG. 13) discussed herein can be adapted, rearranged, expanded, omitted, combined, and/or modified in various ways without deviating from the scope of the present disclosure.

At (1301), the method 1300 can include controlling a first autonomous vehicle that is part of a convoy to provide a vehicle service. For example, the vehicle computing system 102 can control the vehicle 104 to provide a vehicle service. The vehicle 104 can be part of a fleet of vehicles controlled by an operations computing system 120 associated with a service provider, and more particularly, part of a convoy that includes a plurality of vehicles from the fleet. The vehicle computing system 102 can control the vehicle 104 to provide the vehicle service for a second entity associated with the client computing system 122. The vehicle computing system 102 can control the vehicle 104 to provide the vehicle service at least partly in a geographic area under jurisdiction of a third-party entity.

At (1302), the method 1300 can include receiving one or more communication(s) from a remote computing system associated with a third-party entity. For example, the vehicle computing system 102 can receive one or more communications from the third-party computing system 124 associated with the third-party entity. In particular, one or more clients and/or applications operating associated with the third-party computing system 124 can send vehicle messages 316 corresponding to the communication(s) to the offboard gateway 306, and the Vehicle API 304 can provide the vehicle messages 316 to the vehicle 104, through offboard gateway 306 and Vehicle API relay/client 308, as authenticated vehicle messages 312. The communication(s) can include one or more vehicle instruction(s), such as, for example, instructions for selecting the vehicle 104, instructions for stopping the vehicle 104, instructions for the vehicle 104 to relay information to the other vehicles in the convoy, or instructions for the vehicle 104 to provide information to the third-party entity. The vehicle computing system 102 can receive the vehicle instruction(s) as one or more encrypted communication(s) from the third-party computing system 124 associated with a third-party entity, and the vehicle computing system 102 can decrypt the encrypted communication(s) based on a predetermined key.

At (1303), the method 1300 can include determining one or more vehicle action(s) to perform based on one or more vehicle instruction(s) included in the communication(s). For example, the vehicle instruction(s) can instruct the vehicle computing system 102 to stop the vehicle 104. The vehicle computing system 102 can determine an identify of the third-party entity based on the communication(s), and determine one or more vehicle action(s) to perform based on the identity. The vehicle computing system 102 can also determine a vehicle identifier associated with the communication(s), and determine one or more vehicle action(s) to perform if the vehicle identifier corresponds to the vehicle 104. If the vehicle instruction(s) in the communication(s) include an associated priority-level, then the vehicle computing system 102 can determine the vehicle action(s) to perform that correspond to the priority level. If the vehicle instruction(s) include instructions for the vehicle computing system 102 to stop the vehicle 104, then the vehicle computing system 102 can send data indicative of the vehicle instruction(s) to the other vehicle(s) 105 in the convoy, determine a stopping action that corresponds to the vehicle instruction(s), remove the vehicle 104 from the convoy, and implement the stopping action to bring the vehicle 104 to a stop. Alternatively, the vehicle computing system 102 can send data indicative of the vehicle instruction(s) to a lead vehicle 105 in the convoy, receive one or more vehicle instruction(s) from the lead vehicle 105, and implement the vehicle instruction(s) received from the lead vehicle 105. In particular, one or more clients and/or applications operating associated with the vehicle computing system 102 can send vehicle messages corresponding to the vehicle instruction(s) to an offboard gateway, and a Vehicle API can provide the vehicle messages to the other vehicle(s) 105, through the offboard gateway and a Vehicle API relay/client associated with the vehicle(s) 105, as authenticated vehicle messages.

At (1304), the method 1300 can include controlling the first autonomous vehicle to implement the vehicle action(s). For example, the vehicle computing system 102 can control the vehicle 104 to implement the determined vehicle action(s) in response to receiving the one or more vehicle instructions. If the vehicle instruction(s) include instructions for the vehicle computing system 102 to stop the vehicle 104, and the vehicle instruction(s) include a non-critical reason for stopping the vehicle 104, then the vehicle computing system 102 can control the vehicle 104 to implement a soft-stop vehicle action. If the vehicle instruction(s) include instructions for the vehicle computing system 102 to stop the vehicle 104, and the vehicle instruction(s) include a critical reason for stopping the vehicle 104, then the vehicle computing system 102 can control the vehicle 104 to implement an emergency-stop vehicle action. If the vehicle instruction(s) include instructions for the vehicle computing system 102 to stop the vehicle 104, and the vehicle instruction(s) are associated with a low-priority, then the vehicle computing system 102 can control the vehicle 104 to implement a soft-stop vehicle action. If the vehicle instruction(s) include instructions for the vehicle computing system 102 to stop the vehicle 104, and the vehicle instruction(s) are associated with a high-priority, then the vehicle computing system 102 can control the vehicle 104 to implement an emergency-stop vehicle action.

Figure 14:
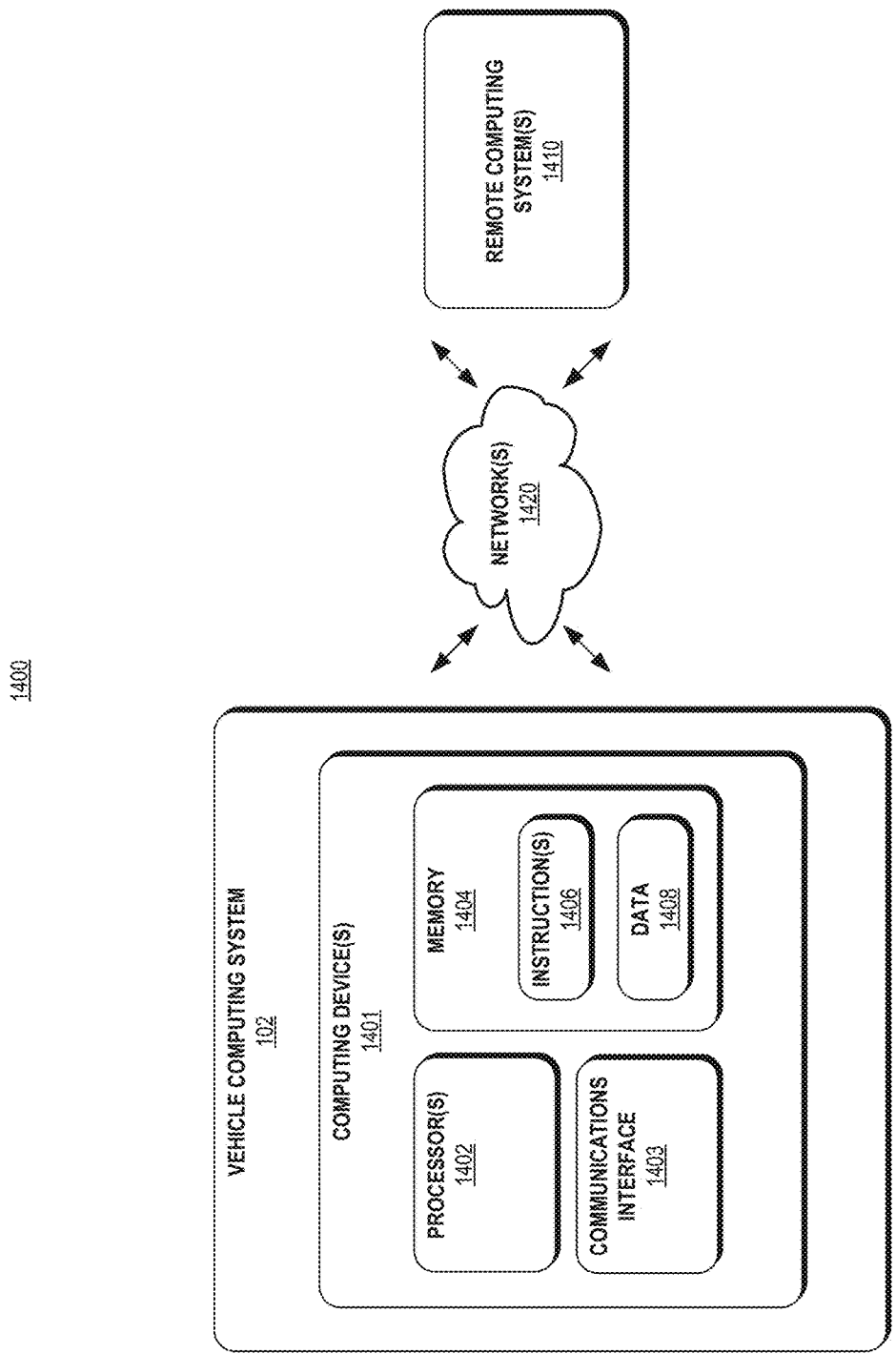
FIG. 14 depicts example system components according to example embodiments of the present disclosure.

FIG. 14 depicts an example computing system 1400 according to example embodiments of the present disclosure. The example system 1400 illustrated in FIG. 14 is provided as an example only. The components, systems, connections, and/or other aspects illustrated in FIG. 14 are optional and are provided as examples of what is possible, but not required, to implement the present disclosure. The example system 1400 can include the vehicle computing system 102 of the vehicle 104 and, in some implementations, remote computing system(s) 1410 including one or more remote computing system(s) that are remote from the vehicle 104 (e.g., operations computing system 120) that can be communicatively coupled to one another over one or more networks 1420. The remote computing system 1410 can be associated with a central operations system and/or an entity associated with the vehicle 104 such as, for example, a vehicle owner, vehicle manager, fleet operator, service provider, etc.

The computing device(s) 1401 of the vehicle computing system 102 can include processor(s) 1402 and a memory 1404. The one or more processors 1402 can be any suitable processing device (e.g., a processor core, a microprocessor, an ASIC, a FPGA, a controller, a microcontroller, etc.) and can be one processor or a plurality of processors that are operatively connected. The memory 1404 can include one or more non-transitory computer-readable storage media, such as RAM, ROM, EEPROM, EPROM, one or more memory devices, flash memory devices, etc., and combinations thereof.

The memory 1404 can store information that can be accessed by the one or more processors 1402. For instance, the memory 1404 (e.g., one or more non-transitory computer-readable storage mediums, memory devices) on-board the vehicle 104 can include computer-readable instructions 1406 that can be executed by the one or more processors 1402. The instructions 1406 can be software written in any suitable programming language or can be implemented in hardware. Additionally, or alternatively, the instructions 1406 can be executed in logically and/or virtually separate threads on processor(s) 1402.

For example, the memory 1404 on-board the vehicle 104 can store instructions 1406 that when executed by the one or more processors 1402 on-board the vehicle 104 cause the one or more processors 1402 (the vehicle computing system 102) to perform operations such as any of the operations and functions of the vehicle computing system 102, as described herein, one or more operations of method 1300, and/or any other operations and functions of the vehicle computing system 102, as described herein.

The memory 1404 can store data 1408 that can be obtained, received, accessed, written, manipulated, created, and/or stored. The data 1408 can include, for instance, data associated with perception, prediction, motion plan, maps, third-party identification, vehicle identification, vehicle status information, and/or other data/information as described herein. In some implementations, the computing device(s) 1401 can obtain data from one or more memory device(s) that are remote from the vehicle 104.

The computing device(s) 1401 can also include a communication interface 1403 used to communicate with one or more other system(s) on-board the vehicle 104 and/or a remote computing device that is remote from the vehicle 104 (e.g., of remote computing system(s) 1410). The communication interface 1403 can include any circuits, components, software, etc. for communicating via one or more networks (e.g., 1420). In some implementations, the communication interface 1403 can include, for example, one or more of a communications controller, receiver, transceiver, transmitter, port, conductors, software, and/or hardware for communicating data.

The network(s) 1420 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 1420 can be accomplished, for instance, via a communication interface using any type of protocol, protection scheme, encoding, format, packaging, etc.

The remote computing system 1410 can include one or more remote computing devices that are remote from the vehicle computing system 102. The remote computing devices can include components (e.g., processor(s), memory, instructions, data) similar to that described herein for the computing device(s) 1401. Moreover, the remote computing system(s) 1410 can be configured to perform one or more operations of the operations computing system 120, as described herein. Moreover, the computing systems of other vehicles described herein can include components similar to that of vehicle computing system 102.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system for autonomous vehicle control, the computing system comprising:
   one or more processors; and
   one or more tangible, non-transitory, computer readable media that store instructions that are executable by the one or more processors cause the computing system to perform operations comprising:
   obtaining data indicative of a first vehicle command associated with a third-party entity, the first vehicle command comprising instructions for an autonomous vehicle,
   wherein the instructions are associated with the third-party entity and the third-party entity is a law enforcement entity or another first responder entity;
   determining a vehicle action for the autonomous vehicle based at least in part on the instructions included in the first vehicle command, the first vehicle command comprising a request for a status of the autonomous vehicle; and
   controlling the autonomous vehicle to implement the vehicle action determined based at least in part on the instructions;
   wherein controlling the autonomous vehicle to implement the vehicle action comprises providing status information to the third-party entity, the status information indicating one of vehicle health or vehicle diagnostics associated with the autonomous vehicle.

2. The computing system of claim 1, wherein obtaining the data indicative of the first vehicle command associated with the third-party entity comprises:
   obtaining the data indicative of the first vehicle command from a computing system associated with a fleet operator of the autonomous vehicle, wherein the computing system associated with the fleet operator is remote from the autonomous vehicle.

3. The computing system of claim 1, wherein the operations further comprise:
   obtaining data indicative of a second vehicle command associated with the third-party entity, wherein the second vehicle command associated with the third-party entity comprises instructions that are based at least in part on the status information for the autonomous vehicle.

4. The computing system of claim 1, wherein the vehicle action comprises stopping the autonomous vehicle.

5. The computing system of claim 4, wherein determining the vehicle action for the autonomous vehicle based at least in part on the instructions included in the first vehicle command comprises:
   determining (i) to stop the autonomous vehicle in a lane in which the autonomous vehicle is travelling, or (ii) to stop the autonomous vehicle at a location out of the lane in which the autonomous vehicle is travelling.

6. The computing system of claim 1, wherein the vehicle action comprises providing a representative of the third-party entity with access to at least a portion of the autonomous vehicle.

7. The computing system of claim 1, wherein the operations further comprise:
   obtaining a second vehicle command associated with the third-party entity, wherein the second vehicle command includes instructions for the autonomous vehicle to resume autonomous operations.

8. The computing system of claim 1, wherein obtaining the data indicative of the first vehicle command associated with the third-party entity comprises:
   obtaining the data indicative of the first vehicle command from a computing system associated with the third-party entity.

9. The computing system of claim 8, wherein the computing system associated with the third-party entity is onboard a vehicle associated with the third-party entity.

10. The computing system of claim 1, wherein the operations further comprise:
    providing information to a computing system associated with a fleet operator of the autonomous vehicle, the information indicating at least one of (1) that the autonomous vehicle obtained the first vehicle command or (2) that the autonomous vehicle implemented the vehicle action.

11. An autonomous vehicle comprising:
    one or more processors; and
    one or more tangible, non-transitory, computer readable media that store instructions that are executable by the one or more processors to cause the autonomous vehicle to perform operations comprising:
    obtaining data indicative of a vehicle command associated with a third-party entity, the vehicle command comprising instructions for the autonomous vehicle,
    wherein the instructions are associated with the third-party entity and the third-party entity is a law enforcement entity or another first responder entity;
    determining a vehicle action for the autonomous vehicle based at least in part on the instructions included in the vehicle command, the vehicle command comprising a request for a status of the autonomous vehicle; and
    controlling the autonomous vehicle to implement the vehicle action determined based at least in part on the instructions;
    wherein controlling the autonomous vehicle to implement the vehicle action comprises providing status information to the third-party entity, the status information indicating one of vehicle health or vehicle diagnostics associated with the autonomous vehicle.

12. The autonomous vehicle of claim 11, wherein the third-party entity is authenticated by at least one of: (i) the autonomous vehicle or (ii) a computing system associated with a fleet operator of the autonomous vehicle.

13. The autonomous vehicle of claim 11, wherein the vehicle command is encrypted, and wherein obtaining the data indicative of the vehicle command comprises decrypting the vehicle command.

14. The autonomous vehicle of claim 11, wherein the data indicative of the vehicle command is further indicative of a reason for the vehicle command from the third-party entity.

15. The autonomous vehicle of claim 11, wherein the autonomous vehicle is identifiable by the third-party entity based at least in part on an identifier associated with the autonomous vehicle.

16. The autonomous vehicle of claim 11, wherein the vehicle command is associated with a priority and wherein the vehicle action is determined based at least in part on the priority.

17. A computer-implemented method comprising:
obtaining data indicative of a vehicle command associated with a third-party entity, the vehicle command comprising instructions for an autonomous vehicle, wherein the instructions are associated with the third-party entity and the third-party entity is a law enforcement entity or another first responder entity;
determining a vehicle action for the autonomous vehicle based at least in part on the instructions included in the vehicle command, the vehicle command comprising a request for a status of the autonomous vehicle; and
controlling the autonomous vehicle to implement the vehicle action determined based at least in part on the instructions;
wherein controlling the autonomous vehicle to implement the vehicle action comprises providing status information to the third-party entity, the status information indicating one of vehicle health or vehicle diagnostics associated with the autonomous vehicle.

18. The computer-implemented method of claim 17, wherein the vehicle action further comprises at least one of: (i) stopping the autonomous vehicle, (ii) providing access to at least a portion of the autonomous vehicle, or (iii) restricting access to at least a portion of the autonomous vehicle.

* * * * *